US007502783B2

(12) United States Patent
Palmon et al.

(10) Patent No.: US 7,502,783 B2
(45) Date of Patent: *Mar. 10, 2009

(54) USER INTERFACE FOR CONDUCTING A SEARCH DIRECTED BY A HIERARCHY-FREE SET OF TOPICS

(75) Inventors: Eran Palmon, Palo Alto, CA (US); Frank Smadja, Haifa (IL); Ofer Ben-Shachar, Palo Alto, CA (US); Ido Dan, Tel Aviv (IL); Guy Tavor, Yaffo (IL)

(73) Assignee: Suggestica, Inc.

( * ) Notice: Subject to any disclaimer, the term of this patent is extended or adjusted under 35 U.S.C. 154(b) by 601 days.

This patent is subject to a terminal disclaimer.

(21) Appl. No.: 11/222,679

(22) Filed: Sep. 9, 2005

(65) Prior Publication Data

US 2006/0059143 A1    Mar. 16, 2006

Related U.S. Application Data

(60) Provisional application No. 60/609,215, filed on Sep. 10, 2004.

(51) Int. Cl.
*G06F 7/00* (2006.01)
(52) U.S. Cl. .............................................. 707/3; 707/5
(58) Field of Classification Search ............... 707/1–10, 707/100–102
See application file for complete search history.

(56) References Cited

U.S. PATENT DOCUMENTS

| 5,924,090 | A | 7/1999 | Krellenstein | 707/5 |
| 5,932,807 | A | 8/1999 | Mallart | 73/641 |
| 6,064,971 | A | 5/2000 | Hartnett | 705/7 |
| 6,421,675 | B1 | 7/2002 | Ryan et al. | 707/100 |
| 6,513,036 | B2 | 1/2003 | Fruensgaard et al. | 707/4 |
| 2002/0040363 | A1 | 4/2002 | Wolfman et al. | 707/5 |
| 2002/0091835 | A1 | 7/2002 | Lentini et al. | 709/227 |

(Continued)

OTHER PUBLICATIONS

K. Bharat and M. R. Henzinger. "Improved Algorithms for Topic Distillation in a Hyperlinked Environment." Proceedings of SIGIR-98, 21st ACM International Conference on Research and Development in Information Retrieval, Melbourne, Australia, pp. 104-111, 1998.

B. D. Davison, A. Gerasoulis, K. Kleisouris, Y. Lu, H. Seo, W. Wang and B. Wu. "DiscoWeb: Applying Link Analysis to Web Search." Proceedings of the Eighth International World Wide Web Conference, Toronto, Canada, p. 148, 1999.

(Continued)

*Primary Examiner*—Wilson Lee
(74) *Attorney, Agent, or Firm*—Tucker Ellis & West LLP

(57) ABSTRACT

A computer implemented method, and a software product for directing a search aided by a set of topics, the topics not necessarily having a hierarchy. Each topic is attached to at least one information item of a plurality of information items, such as a Web page identified by a URL. The method includes identifying one or more information items of the plurality of information items, and determining one or more suggested topics from the set of topics according to the attachments of the suggested topics to the identified information items, and providing search results to the user including at least some of the identified information items and at least one of the suggested topics. Selecting one of the suggested topics generates a new set of suggested topics, such that a hierarchy of topics is formed on the fly for a particular search.

27 Claims, 8 Drawing Sheets

U.S. PATENT DOCUMENTS

| | | | |
|---|---|---|---|
| 2002/0112028 A1 | 8/2002 | Colwill, Jr. | 709/218 |
| 2002/0120619 A1 | 8/2002 | Marso et al. | 707/3 |
| 2003/0014399 A1 | 1/2003 | Hansen et al. | 707/3 |
| 2003/0055831 A1 | 3/2003 | Ryan et al. | 707/100 |
| 2003/0055983 A1* | 3/2003 | Callegari | 709/227 |
| 2003/0088554 A1 | 5/2003 | Ryan et al. | 707/3 |
| 2004/0205065 A1 | 10/2004 | Petras et al. | 707/5 |
| 2005/0055306 A1 | 3/2005 | Miller et al. | 705/37 |
| 2005/0071328 A1 | 3/2005 | Lawrence | 707/3 |
| 2005/0086248 A1* | 4/2005 | Atchison | 707/102 |

OTHER PUBLICATIONS

Osmar R. Zaïane. "From Resource Discovery to Knowledge Discovery on the Internet." Technical report CMPT1998-13, Computing Science Department, Simon Fraser University, Canada, 1998. Available online at: citeseer.ist.psu.edu/117999.html.

S. Brin and L. Page. "The Anatomy of a Large-Scale Hypertextual Web Search Engine." WWW7 / Computer Networks and ISDN Systems, vol. 30, No. 1-7, http://www-db.stanford.edu/~backrub/google.html, and www-db.stanford.edu/pub/papers/google.pdf.

"History of Search Engines and Directories-Search Engine History." Downloaded Dec. 7, 2005. SEO Consultants Directory, Orange, CA. Available online at: http://www.seoconsultants.com/search-engines/history/.

Chris Sherman. "Yahoo Launches My Web Personal Search." Published online by SearchEngineWatch.com on Apr. 27, 2005. Downloaded Aug. 11, 2005. Available online at http://searchenginewatch.com/.

"Northern Light Enterprise Search Engine Overview White Paper." Dated Jun. 15, 2004, by Northern Light Group LLC, Cambridge, MA, and also available online at: www.northernlight.com.

"Learning Search: Advanced search service for websites everywhere." Downloaded Aug. 20, 2004. SLI Systems, Cupertino, CA. Available online at: http://www.sli-systems.com/learning_search.shtml.

"Related Search: Automatically generated search suggestions for search engines." Downloaded Aug. 20, 2004. SLI Systems, Cupertino, CA. Available online at: http://www.sli-systems.com/related_search.php.

Chris Sherman. "Yahoo Introduces Personal Search." Published online by SearchEngineWatch.com on Oct. 5, 2004. Downloaded Aug. 11, 2005. Available online at: http://searchenginewatch.com/.

* cited by examiner

FIG. 7

USER INTERFACE FOR CONDUCTING A SEARCH DIRECTED BY A HIERARCHY-FREE SET OF TOPICS

RELATED PATENT APPLICATIONS

The present invention claims priority of U.S. Provisional Patent Application No. 60/609,215 filed Sep. 10, 2004 to inventors Palmon, et al., titled USER CREATING AND RATING OF ATTACHMENTS FOR CONDUCTING A SEARCH DIRECTED BY A HIERARCHY-FREE SET OF TOPICS, AND A USER INTERFACE THEREFOR. The contents of such provisional patent application are incorporated herein by reference.

The present invention is related to concurrently filed U.S. patent application Ser. No. 11/222,679 to inventors Palmon, et al., titled CONDUCTING A SEARCH DIRECTED BY A HIERARCHY-FREE SET OF TOPICS, and to concurrently filed U.S. patent application Ser. No. 11/223/817 to inventors Palmon, et al., titled CREATING ATTACHMENTS AND RANKING USERS AND ATTACHMENTS FOR CONDUCTING A SEARCH DIRECTED BY A HIERARCHY-FREE SET OF TOPICS. The contents of each of these related patent applications are incorporated herein by reference.

BACKGROUND

The present invention is related to searching for information, for example, searching for information on the Internet. In particular, the present invention is related to searching for information guided by a set of topics such as keywords, wherein the set of topics is not necessarily hierarchical, and wherein during any particular search, any search hierarchy of topics is created on the fly.

It is known to search for information that may reside locally or that may be distributed in a network or internetwork, even distributed over the Internet. Google and Yahoo, for example, have become synonymous with searching the Internet for information. The results of such a search are an ordered set of URLs to Web pages on the World Wide Web (the "Web") or other items of information.

It is also known to categorize information by attaching categories or keywords—called topics herein—to each item of information. Yahoo, for example, started as a directory of the Web that allowed one to search guided by such topics. Such prior art categorization is explicitly hierarchical, in that topics have subtopics, and so forth, such that the set of topics may be structured as in the form of a tree structure or a graph. One problem with such hierarchical categorization is that a once a first topic is selected, the only subtopics available for further searching are those children of the first topic. This may lead to missing some results, or to not being well directed using the categorizations.

Therefore, structuring topics with a strict hierarchy may lead to unsuccessful searches.

It also is known how to classify search results automatically into a topic of a hierarchical set of topics. U.S. Pat. No. 5,924,090 to Krellenstein and the Northern Light Search Engine product—see "Northern Light Enterprise Search Engine Overview White Paper," dated Jun. 15, 2004, by Northern Light Group LLC, Cambridge, Mass., and also available online at www.northernlight.com—describes such automatic classification, but on a pre-defined hierarchical set of topics. The set of topics, however, is pre-defined with a hierarchy. If a non-hierarchical pre-defined set of topics is used, no hierarchy of topics is generated. It is desirable, however, to have a hierarchy of topics to guide a search. That is, after selecting either a search term or a topic, it is desirable to generate candidate topics to further refine the search without the need to have a predefined hierarchy among topics.

It is also known to cluster search results on the fly without an already defined set of topics. See for example the Vivísimo Clustering Engine™, made by Vivísimo, Inc., of Pittsburgh, Pa. This clustering engine automatically organizes search or database query results into meaningful hierarchical folders on the fly. The clustering engine transforms a list of search results into categorized information without any pre-processing of the source documents. The categories, however, are not pre-defined, but rather selected from the words and phrases contained in the search results themselves. Vivísimo's Clustering Engine does not use pre-defined subjects; its descriptions are created on the fly from the search results list. No hierarchy of topics is generated.

See also B. D. Davison, A. Gerasoulis, K. Kleisouris, Y. Lu, H. Seo, W. Wang and B. Wu: "DiscoWeb}: Applying Link Analysis to Web Search", Proceedings of the Eighth International World Wide Web Conference," Toronto, Canada, page 148, 1999. See also Krishna Bharat and Monika R. Henzinger: "Improved algorithms for topic distillation in a hyperlinked environment," Proceedings of SIGIR-98, 21st ACM International Conference on Research and Development in Information Retrieval, Melbourne, Australia, pages 104-111, 1998 for a discussion of how to analyze Webpages and rank them according to relevance and clusters.

Thus there is a need in the art for a search method that includes classifying potential search results under topics, with the set of topics not necessarily hierarchical, but with a hierarchy of topics generated on the fly to guide the search.

Topic-guided searching is also known wherein after each search step, suggested topics for further searching are provided. For example, shopping Web sites such as BizRate.com, of Los Angeles Calif., are known that as a result of a search, suggest shopping topics for further search. These topics, however, are pre-determined and have a hierarchical structure. For example, a topic "Computers & Software" exists in BizRate.com, and under this topic is the topic "Digital Cameras." Under "Digital Cameras" are several topics, such as the brand names Canon, Kodak, etc., the different resolutions ranged for digital cameras, etc. The topics have a hierarchical structure.

It is desired to provide the same guidance as provided in topic-guided searching, but wherein topics do not have a hierarchical structure.

There also is a need to provide the ability for a searcher, e.g., one who is registered (a "user"), to define new topics to add to the set of topics, and to define attachments between information items and the newly defined topic, and also previously defined topics.

Not all attachments between topics and information items are equally relevant. For example, one topic may be "better" or more applicable to a page on the Web than another. Thus there is a need in the art to measure the quality of an attachment between an information item and a topic.

Similarly, not all users are equally credible. Thus, there further is a need in the art to rate users according to a credibility measure.

There further is a need in the art for providing personalization for registered users. For example, a registered user may wish to have previous searches or previous traversals of topics, be recorded for re-use.

SUMMARY

One aspect of the present invention is the providing of a set of topics useful for guiding a search, each topic having attachments to one or more items of information, e.g., Web pages that are appropriate for the topic. The set of topics is not necessarily hierarchically arranged. Rather, for a particular search starting with an initial topic or a search phrase, a hierarchy of topics for the particular search is determined on the fly. Each step of the hierarchical search includes selecting a topic or providing a search phrase, and results in a set of suggested topics for furthering the search. At any stage, results for the search so far, e.g., URLs of the information items, are also provided. The set of suggested topics is generated by an analysis of the attachments of the search results under the initial search or the search topic. One aspect of the invention is that the suggested topics include one or more refinement topics determined from the plurality of topics according to a refinement topic criterion.

In one embodiment, an initial search page provides for a user to input a search phrase and also to sign-in, in the case that a user is not signed in. Thus, initially, a searcher inputs a search phrase and is presented with a set of suggested topics, including refinement topics, and selected information items that result in searching for the input search phrase. The searcher may now select a topic from the suggested topics, or a new search phrase.

In another embodiment, an initial set of topics is pre-defined, and this initial set of topics is used to determine an initial set of suggested topics.

One aspect of the invention is that in some embodiments, it provides users, e.g., searchers who have registered by providing registration information, with the ability to create topics. In one version, in which an initial set of topics is pre-defined, users are thus provided with the ability to add to the initial set of topics. Another aspect of the invention is providing the capability for such users to create attachments between information items and topics. Another aspect of the invention is providing for such users the ability to rate attachments. In one embodiment, users are provided with the mechanism to rate an attachment between a topic and an information item using a binary rating system that has a first value ("positive," positively rated") and a second value ("negative," negatively rated") less favorable than the first value. Another aspect of the invention is a method of calculating an overall attachment quality for each attachment based on the rating of the attachment by users.

Another aspect of the invention is that a registered user may select one or more topics to be "preferred" or "favorites" for that user. That user is presented with a view of the search results that differs from what is presented to another searcher. In one embodiment, the suggested topics for furthering a search are presented in an order in which topics that have been selected to be favorites appear before other topics.

Another aspect of the invention is that suggested topics, e.g., refinement topics for furthering a search are presented in an order determined according to a refinement topic ranking method. In one embodiment, the ranking method depends on how registered users of the system have rated attachments to the search results for each potential refinement topic, in particular, according to the calculated overall attachment quality of the attachments between a potential refinement topic and the information items of the search results.

Yet another aspect of the invention is a carrier medium, e.g., a storage mechanism, for storing a data structure that includes a user data structure to store the set of topics, a topic data structure configured to store the set of topics, the topics not necessarily being hierarchically structured, an attachment data structure configured to store the attachments between topics and information items, e.g., Web pages. The data structures are part of a main data structure. In one embodiment the main data structure is in the form of a set of tables of a relational database, and the topic data structure, the user data structure, and the attachment data structure are each a table of the database.

BRIEF DESCRIPTION OF THE DRAWINGS

FIG. 7 shows an embodiment of a third user interface display that might result at the same stage of a multi-stage search for an exemplary search as shown in FIG. 6, but for a registered user.

DETAILED DESCRIPTION

Described herein are a method and a search engine in the form of a computer program implementing a method to aid in searching. A set of topics is defined, the topics not necessarily hierarchical. At any stage of a search, a person using the system—called a searcher—provides either a search phrase or selects a topic from a provided first subset of the topics. As a result of the search, the searcher is provided with a second subset of the topics that would further the search, and in one embodiment, with results of the search so far.

A searcher may register with the system by providing registration information to become what is called herein a user. Described herein is a method and a search engine in the form of a computer program that provides for users having a measure of credibility, so that, for example, topics and attachments between topics and information items created by different users may have different quality measures according to the credibility of users who define the attachments.

The main application described herein is of searching for Web pages. However the invention is not restricted to such an application. In general, one aspect of the invention is searching for "items of information," also called "content elements" and "information items." Thus, in the embodiment mostly described herein, these information items are Web pages. In another embodiment, these are publications or documents, and in yet another embodiment, these information items are data elements residing in a database. Other applications and combined applications also may be envisaged. In the description herein, each information item, whether a Web page or otherwise, can be assumed to have a uniform resource locator URL that describes its location, e.g., in a computer network, on a local computer, in an internetwork, in the Internet, or elsewhere. Thus, without loss of generality, the term URL will be used herein to refer to the information item.

Thus there is a set of topics to which URLs may be attached. In one embodiment, the set of topics is predefined. In another embodiment, a topic may be added to the set of topics by a registered user to create a larger set of topics. The set of topics does not necessarily have a hierarchical structure, and in the description herein, it is assumed that the set of topics does not have a hierarchy.

Client-Server Computer Network

Figure 1:
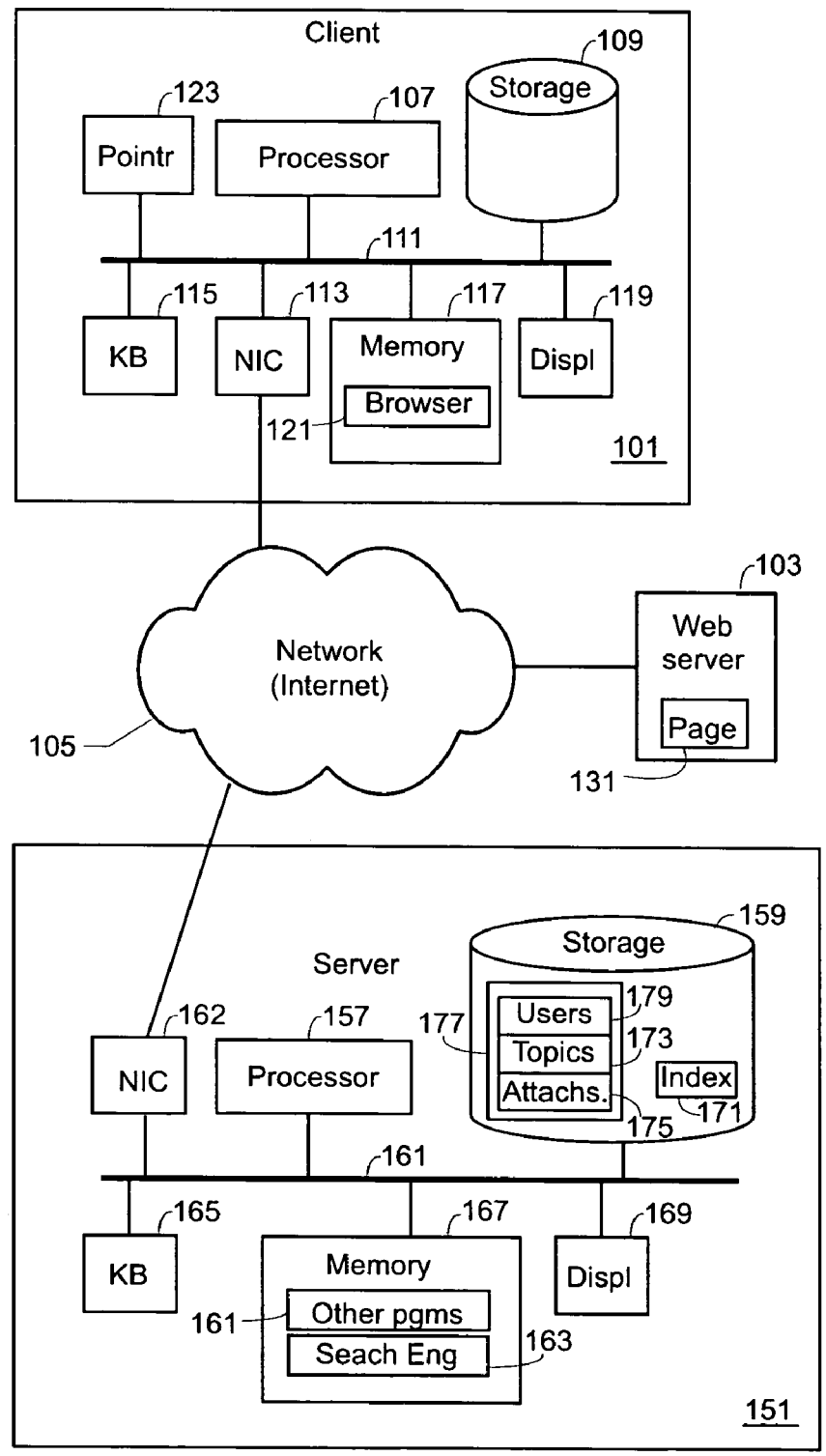
FIG. 1 shows an embodiment of a client system coupled to a network such as the Internet, or an intranet, and which includes an embodiment of the present invention.

The present invention is preferably, but not necessarily, implemented in a client-server computer network, i.e. on a distributed computer system. An exemplary client-server environment that includes an embodiment of the present invention is illustrated in FIG. 1. An exemplary client 101 is connected to an exemplary Web server 103 via a network 105, and to a search server 151 via the network 105. For illustrative purposes, the network 105 is the Internet. However, network 105 may be a private network (an intranet), an internetwork, an extranet or any other known mechanism for providing a network connection. While only one Web server 103 is shown, the Web server 103 can be one of a plurality of servers that are accessible by clients such as client 101. The Web server is also accessible by a search server, shown as search server 151.

An exemplary client machine such as client 101 typically includes a processing system of at least one processor 107, a memory subsystem 117, a display subsystem 119, a keyboard 115, a pointing and selecting device 123 such as a mouse or another input device, all such input devices collectively shown as 123, local storage 109, and a network interface (NIC) 113 coupling the processor system to the network 105. The elements of the processing system of the client are coupled via a bus subsystem 111 that is shown for the sake of simplicity as a single bus. The client may include more or fewer components as is known.

An exemplary search server such as search server 151 includes a processing system of at least one processor 157, a memory subsystem 167, a display subsystem 169, a keyboard 165, local storage 159, and a NIC 162 coupling the processor system to the network 105. The elements of the processing system of the server 151 are coupled via a bus subsystem 161 that is shown for the sake of simplicity as a single bus. The search server may include more or fewer components as is known.

An exemplary Web server such as Web server 103 also includes a processing system not shown in detail in FIG. 1. The Web server stores Web pages that are each identified by a URL, as is well known. One such Web page is shown as page 131.

The client 101 includes a browser application 121 shown in FIG. 1 as being in memory 117, although those in the art will understand that not all instructions of the browser may be in memory at the same time, even when the browser is in operation. The user interface assumed in this description is implemented as pages that are displayed on the client's display 119 using a browser application 121.

The search server 151 includes a search engine application 163 shown in FIG. 1 as being in memory 167. The search engine includes aspects of the present invention, that is, a set of instructions implementing an embodiment of the invention, although those in the art will understand that not all instructions of the search engine 163 may be in memory at the same time. The search server 151 may also include one or more other programs shown as 161 in FIG. 1.

Furthermore, while FIG. 1 shows the search engine 163 operating in the search server 151, other embodiments of the invention need not operate, and in many cases will not operate, on one server, but may operate on some other processor coupled to the shown search server, e.g., coupled to the server 151 via the Internet, or coupled to the server 151 via a local area network. It may also be that several method embodiments of the invention may operate at several locations all coupled via the Internet or a local network. Furthermore, a search engine in a processor on the internet may assign at least one task to various processors such that some aspects of the invention may operate remotely on at least one computer system, even in parallel on the computer system(s). How to modify the description herein to be implemented in a distributed manner would be clear to those in the art.

It may also be that several method embodiments of the invention may operate at several locations all coupled via the Internet or a local network. Furthermore, a search engine in a processor on the Internet may assign at least one task to various processors such that some aspects of the invention may operate remotely on at least one computer system, even in parallel on the computer systems. How to modify the description herein to be implemented in a distributed manner would be clear to those in the art.

The Web Search for a Search Phrase

Searching, e.g., searching the Internet for Web pages is well known. Yahoo, Google, etc., all operate such searches. For simplicity, it is assumed that such a search uses an index, and one such index 171 is shown in storage 159 of the search server. The search engine is assumed to include elements to perform a Web search for one or more search terms, providing results, e.g., ranked by a "relevance score," and such search elements are assumed to be known. See, for example, Ricardo Baeza-Yates, Berthier Ribiero-Neto, Berthier Ribeiro-Neto: "Modern Information Retrieval," Addison-Wesley; 1999; C. J. van Rijsbergen, "Geometry of Information Retrieval," Cambridge, England: Cambridge University Press, 2004; or C. J. van Rijsbergen, "Information Retrieval," 2nd Edition: London: Butterworths, 1979. In one embodiment, the part of the search that searches for one or more search terms is carried out remotely to the search server 151, e.g., using a service such as Google's or Yahoo's. The set of search terms searched for in the Web search may be a word, a set of words, a logical combination of sets of words such as a Boolean expression of search terms, or equivalent. The term "search phrase" is used herein to denote each and all such items that are searched for. Furthermore, a plurality of search phrases may be entered in the course of a multi-step search. In such a case, the search phrase is the desired combination, e.g., union/logical sum of the search phrases.

Searchers and Users

A person using the search method is called a searcher. Such a searcher may or may not be registered with the search server. A person registered with the system, e.g., by providing registration information, is called a user herein. A user is identified in one embodiment by an e-mail address, and in another embodiment by a unique username. The user identifier is denoted UserID herein A set of users, i.e., registered searchers is maintained by the search server 151 and shown as a user data structure 179 in the storage 159 of the search server 151. Each element in the data structure 179 represents a user.

In one embodiment, the user data structure is part of a main data structure 177 residing in the storage 159 of search server 151. In a particular embodiment, the main data structure 177 is in the form of a relational database that includes a set of tables. In such an embodiment, the user data structure 179 is a table of the main data structure 177.

Topics

The method uses a set of topics, shown in FIG. 1 as a topic data structure 173 of the main data structure 177 residing in the storage 159 of Search server 151. Each topic is an element in the topic data structure 173. The topics are not necessarily hierarchically structured, and one inventive aspect of the invention is carrying out a search guided by a non-hierarchically-structured set of topics. Each topic is attached to at least one URL of a set of URLs that form the universe of searchable items. Thus, by an attachment is meant an association between a URL and a topic. Each attachment is defined by at least the <URL,topic> doublet. As described further below, a user may create an attachment, and in such a case, each attachment is described by at least the triplet <UserID,<URL, topic>>, where UserID is the user identifier. In the embodiment in which the data structure 177 is in the form of a set of tables of a relational database, the topic data structure is a table 173. The attachments are shown in FIG. 1 as an attachment data structure 175 that is part of the data structure 177. In the embodiment in which the main data structure includes a set of tables of a relational database, the attachment data structure is an attachment table 175.

While the topics are not hierarchically structured in the table 173, one aspect of the invention is that a hierarchy for a particular search is generated on the fly as a result of a searcher selecting topics and/or search terms.

Client-Side and Server Side Operation

A method embodiment for operation by a searcher at the client side conducting a search is now presented. The search operates on the search server side.

Figure 2:
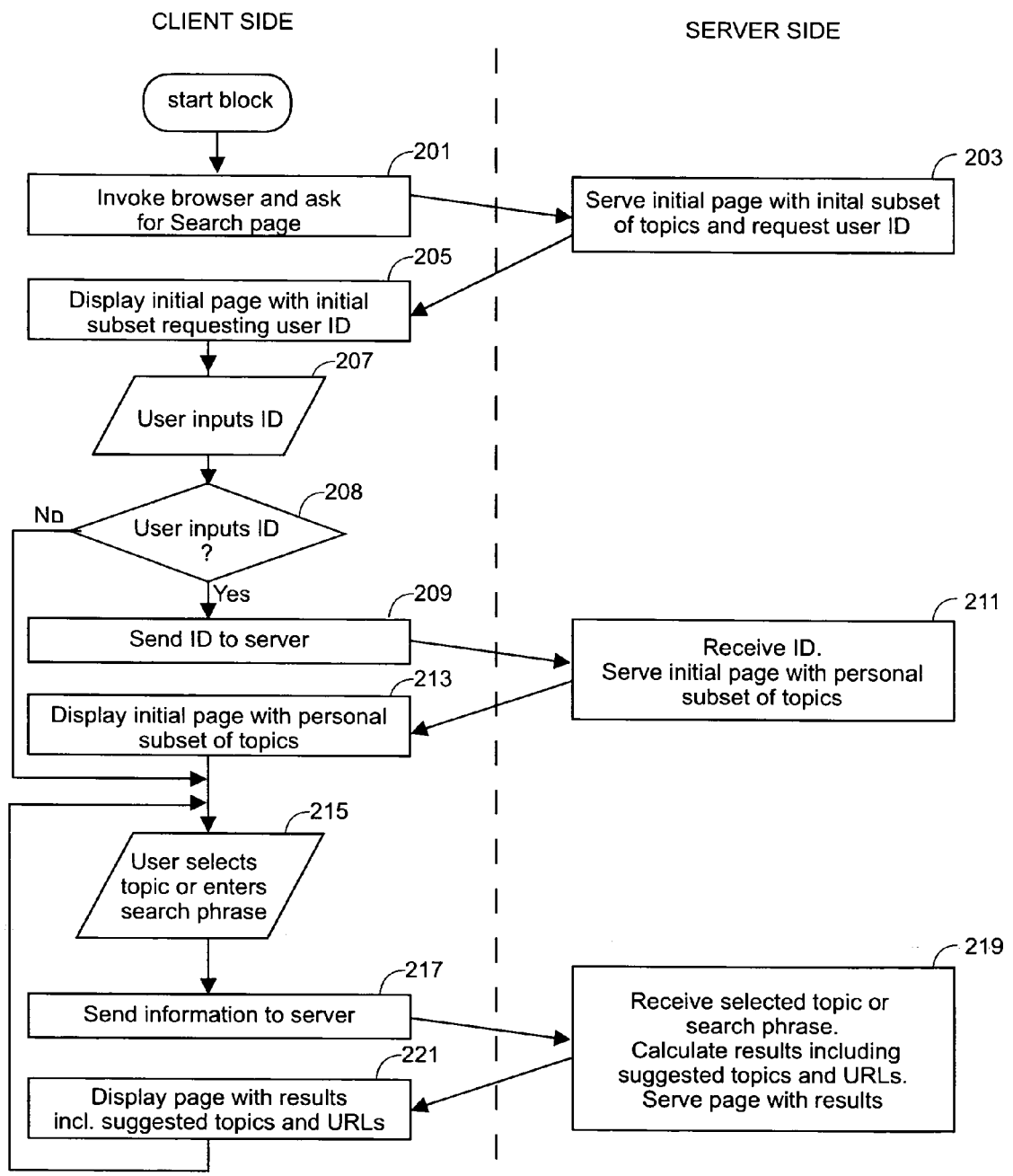
FIG. 2 shows a simplified flow chart of a method embodiment of the invention, shown as client side activities, and activities that occur at the search server in the network of FIG. 1.

FIG. 2 shows one method embodiment 200 of the invention, shown in what occurs at the client side and the server side. At the client side, a searcher in 201 invokes the browser and requests a search page from the search server 151 for display on the display 119 of the client 101. This is done, for example, by indicating to the client a Website that causes the Search server 151 to serve a start page for the searcher. On the search server side, in 203, the search engine 163 serves an initial search page that includes provision for the searcher to enter a search phrase.

In one embodiment, provision is also provided on the initial page displayed in 205 for a searcher who is a user, i.e., who has provided registration information, to log into the system by providing, in 207, a username and password. In such an embodiment, provision is also presented for a non-user searcher to register with the system to become a user, by providing registration information to the system, or to choose to continue as a non-user.

In a variation, the initial search page also includes an initial subset of the set of topics presented to the searcher, with provision for the searcher to select any of the presented topics. In one embodiment, the initial subset is pre-defined as an initial subset of topics to present to any searcher. In another embodiment, the initial subset is user specific. For example, in one version, the user-specific initial set is pre-defined according to properties, e.g., properties entered during registration of a user. In one version, alternatively or in addition, a particular user can modify the pre-defined initial subset to form a personalized user-specific subset for initial display. A user of the set of users may add to a general initial subset of topics or a user-specific initial subset by defining new topics and/or new attachments between topics and information items. Alternatively, in addition, the user-specific initial set is calculated according to previous activity by the user. In one embodiment, the user table 179 thus includes information on the personalized subset of topics for each user. In another embodiment, the topics table 173 includes for each topic the names of each user that claims "ownership."

On the client side, the client 101 receives the initial page, and the Web browser displays the initial page on the display 119. The user may input proper user name and password (collectively "user ID") in 207.

If the user has successfully inputed a proper user name and password (see branch 208), the client in 209 sends the user ID to the server 151. The search engine 163 in 211 receives the information, looks up the user ID (denoted UserID herein) in the set of users in table 179 to authorize the user, and assuming successful authorization, in 211 serves a new initial page. In one embodiment, the initial page includes an initial subset of the topics personalized, e.g., selected by or for the user.

At the client side, in 213, the new initial page with the personalized subset of topics is presented to the user on the display 119 with provision for the user to select one of the topics, e.g.; by clicking-on the display of a topic, or by the user entering a search phrase and causing a search, e.g., by pressing a button labeled search on the initial page.

In the remainder of the discussion, the searcher may be a user or, as a result of branch 208, a non-registered searcher.

Thus, in the case that topics are provided for the user, the client 101 at 215 waits for the searcher to select a topic or input a search phrase. The selected topic and any search phrase input is referred to herein as the "search request information." Once the search request information is provided, then, in 217, the client sends the search request information to the search server 151.

At the search server 151, in 219, the search request information is received, and the search engine in 219 generates results based on the search request information. As will be described in more detail below, one aspect of the invention is that the search results generated in 219 include one or more URLs that meet the search request information according to one or more search criteria (see below), and further includes one or more sets of suggested topics that the searcher may select such that the searcher's electing any of the suggested topics will further direct the search. The generating of the suggested topics is described in more detail below.

Continuing at the search server, 219 further includes generating and serving a new page containing the search results, including the suggested topics, and further including any topics selected so far.

At the client 101, in 221, the served page is received and displayed to the searcher. The searcher may now continue the search. The client side process thus returns to 215 wherein the client 101 waits for the searcher to select a topic, e.g., one of the suggested topics as an additional topic, or a previously selected topic, or for the searcher to enter a new search phrase, or for the searcher to select one of the displayed URLs for further display.

Note that the flow chart of FIG. 2 does not include such details as the searcher ending the process, a user logging off, a non-registered searcher registering, and so forth. That such features may be included would be clear to those in the art, and further, how to expand the flow chart to include such features would be clear to those in the art. Furthermore, the flowchart of FIG. 2 does not include details on-how to receive Web pages, how to generate Web pages, and other aspects that would also be known to those in the art.

A hierarchical search may thus be continued by continuing with 215, 217, 219, and 221 that include requesting and providing search request information on the client side, then generating results for the search request information and a Web page containing the results in the search server side, then displaying the results in back in the client side. Each such loop furthers the search in a hierarchical manner.

Note that when URLs are displayed, e.g., as results of a search for search request information, each of the URLs may be displayed in various forms, including a digest of the contents, as is common today in search engines such as those operated by Google, Inc., of Mountain View, Calif. Clicking on the URL provides a display of the web page to the searcher or user.

In one embodiment, the results page served in 219 and displayed to the searcher in 221 includes:

Each topic so far selected and each search phrase so far entered, in order.
A set of suggested topics.
The search phrase or the present phrase and previous included phrases.
The URLs of the search phrase under the topics so far selected.

One embodiment provides for a user, i.e., a registered searcher, to define a set of favorite topics. In such an embodiment, the results page served in 219 and displayed to the searcher in 221 further includes the set of the user's favorite topics.

Search Topic Paths and Search Criteria

A search may be hierarchical in that the search may traverse a set of topics by the searcher selecting one topic, then next time a page is requested, another topic, and so forth. For example by selecting a search topic A, the searcher will be shown a set of results under, i.e., attached to topic A. By now selecting a second topic, say topic B, the searcher will see results that are attached to topic B from within the previously shown results, thus also attached to topic A. Thus, a hierarchy of topics is generated on the fly for the searcher. By a search topic path is meant the set of topics selected during a particular search by a particular searcher. The last topic in a search topic path is the most recently selected topic in such a traversal. In one embodiment, the order of the search topic path is not important, in that any URL in a search topic path has an attachment to each and every topic in the search path. However, the ordering may still be displayed to the searcher as an aid to show the searcher the ordering in the set of topics so far selected.

Thus, at any stage, the search request information includes the search topic path and any search phrase.

Note further that at any point in a search, the searcher may shorten the search topic path by selecting an earlier traversed topic as the last topic.

For example, denote by A, B, C, and D four topics of the set of topics. Denote by A>B>C>D the search topic path of a presently displayed page requesting search request information. The searcher may now select topic C in the search topic path. The search request information now includes the search topic path A>B>C, and the new resulting search page will have as the search topic path A>B>C, and the URLs displayed will each have an attachment to each of topics A, B, and C.

Search request information thus includes the active search topic path and any active search phrase. Note that a search phrase acts as if it is a topic—thus called a pseudo-topic herein—in that any URL that satisfies the criterion or criteria for a search phrase may be considered similar to being attached to the search phrase, called a pseudo-attachment herein. Thus, when there is a search phrase, denoted by S, and a search topic path A>B>C>D, the search request information consisting of A>B>C>D and search phrase S may be considered as the search topic path A>B>C>D>S, with the search phrase S considered a pseudo-topic and URLs that result from searching for S regarded as having pseudo-attachments to the phrase S. A searcher can enter several search phrases in a search, for example S1 and S2, thus creating a path like A>B>S1>C>S2 In one embodiment, this is the same as the search path A>B>C>(S1.and.S2).

Suggested Topics

At any stage in the hierarchical search, the method at 219 accepts search request information including a new or modified search phrase or a new or modified search topic path as a result of a searcher providing a search phrase or selecting a topic. The method at 219 produces results in the form of URLs, and one or more sets of suggested topics.

Note that in one embodiment, the providing by a searcher at 215 of new search request information consists of the searcher's entering or modifying a search phrase, or of selecting a topic. In another embodiment, a searcher at 215 can both enter/modify a search phrase and also select a topic.

Further selecting any of the suggested topics will further direct the search.

In one embodiment, one of the sets of suggested topics is a set of topics that narrows the search ("refinement topics") such that an additional topic is added to the last search topic path. In another embodiment, one of the sets of suggested topics is a set of topics that would produce similar or related results ("similar topics"), such that an alternate last topic replaces the last topic in the previous topic path. In an alternate embodiment, a searcher may select a similar topic to replace the whole search path. For example, in a Microsoft Windows environment, the user may select to replace the last selected path, or, by right clicking during the selection, select to replace the complete search topic path.

Thus, even though the topics of the set of topics are not necessarily hierarchical, a hierarchy of topics is generated on the fly as a result of a multi-step search.

Figure 3:
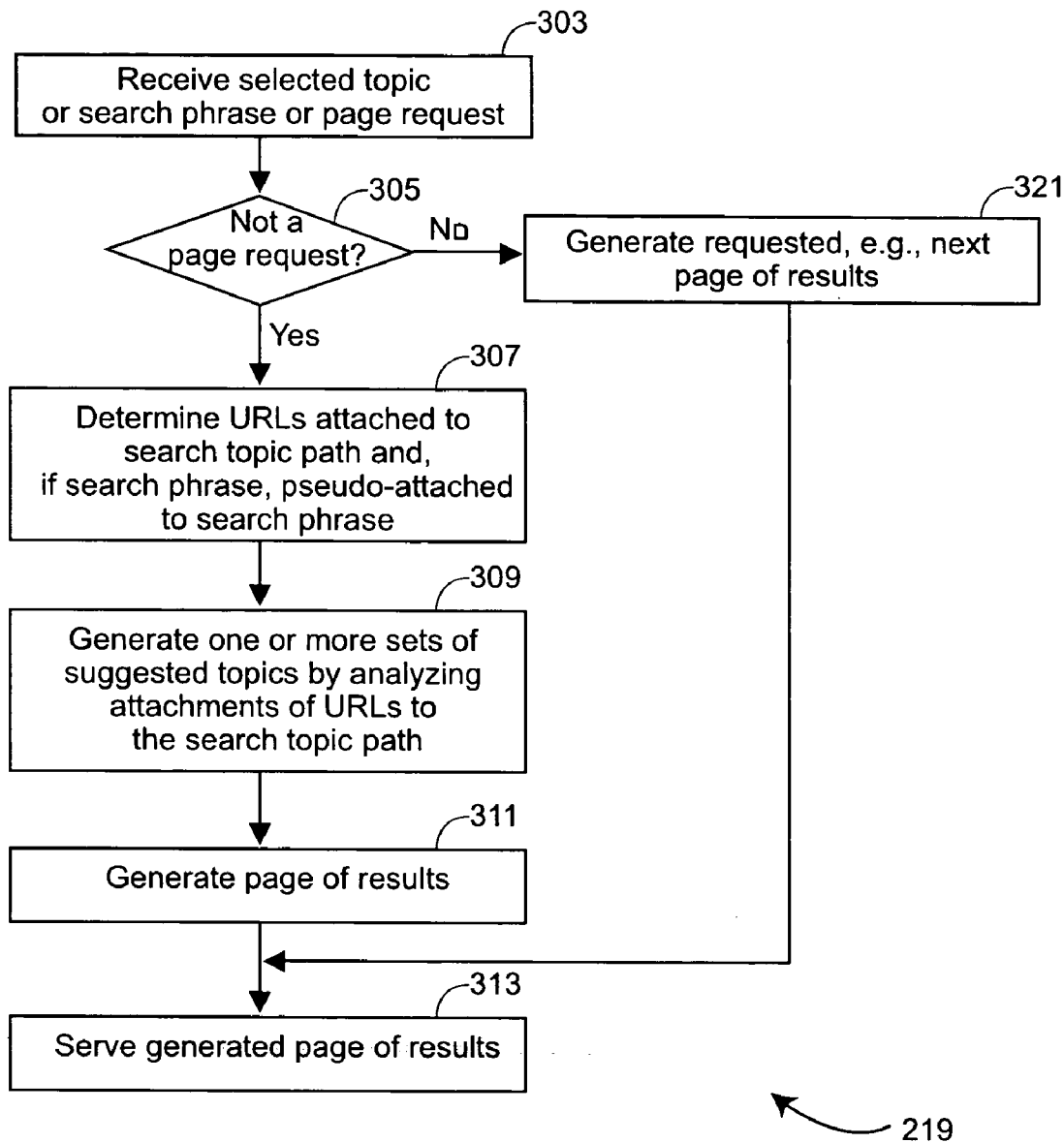
FIG. 3 shows a simplified flow chart of a method carried out at the search server that includes accepting search request information, determining the search results, and forming a Web page to display the search results to a searcher.

FIG. 3 is a simplified flow chart of block 219 in the flow chart of FIG. 2. In 303, the search phrase or the selected topic is accepted, or other input from the searcher.

Recall that search results may be formatted into several Web pages of results, such that the searcher or user may request to see another page, e.g., the next page of results. If the other input is a request for displaying another page of an already served search result, a branch 305 continued with the method forming, in 321, the requested, e.g., next page of the existing search result. This requested page is served in 313.

Otherwise, in 307, the method determines the URLs attached to the (updated) search topic path and, if there is a search phrase, that also are "pseudo-attached" to a search phrase in that the URLs are those that result in searching for the search phrase.

The actual search method for searching for the search phrase is not further described herein. Any known search method may be used. In one embodiment, the searching is carried out remotely to the search server, using, for example a separate search engine at a remote location, e.g., run by some third party such as Google or Yahoo.

In 309, one or more sets of suggested topics are generated by analyzing the attachments of the URLs to the search topic path.

One embodiment includes as one of the sets of suggested topics a set of topics that narrow the search. These topics are called "refinement topics" herein. Such refinement topics provide for refining a search.

In one embodiment, one of the sets of suggested topics is a set of topics that would produce similar or related results, called "similar topics" herein.

In yet another embodiment, in the case that the searcher is a user who has defined a set of favorite topics, the user's favorite topics are provided as a set of suggested topics.

In the preferred embodiment, all three sets of suggested topics, if non-empty, are presented to the searcher to further the search. That is, the method provides for the searcher a set of refinement topics, a set of similar topics, and the user's favorite topics set in the case of a user having a favorite topics set.

In 311, the method forms a page. In one embodiment, the page includes:
- The search topic path, with provision for selecting any of the topics therein.
- The set of refinement topics ordered according to a refinement topic ordering criterion.
- The set of similar topics ordered according to a similar topic ordering criterion.
- In the case, of a user who has a set of favorite topics, the set of favorite topics.
- The URLs attached to the search topic path and if there is a search phrase, pseudo-attached to the search phrase, in an order according to a search order criterion.
- Provision for entering a search phrase, and if there already is a search phrase, the search phrase or phrases. In the case that several search phrases were input in the course of the search, the search phrase is shown in the form of a combination of the entered search phrases.
- In case the search results are not displayable in a single page, provision for the searcher to request the next page also is included.

In 313, the method serves the resulting page to the client.

User Interactions and Attachments

One aspect of the invention is providing a user, i.e., a registered searcher, with the ability to create topics. Another aspect of the invention is providing a user, i.e., a registered searcher with the ability of defining attachments from a URL to an existing (or newly created) topic. Such an attachment is credited to the user. Hence an attachment between a doublet <URL,Topic> is at least a triplet <UserID, <Topic, URL>>, where UserID is the user identifier.

The elements in the table for the set of attachments 175 thus include a user of the user table 179 in data structure 177.

Figure 4:
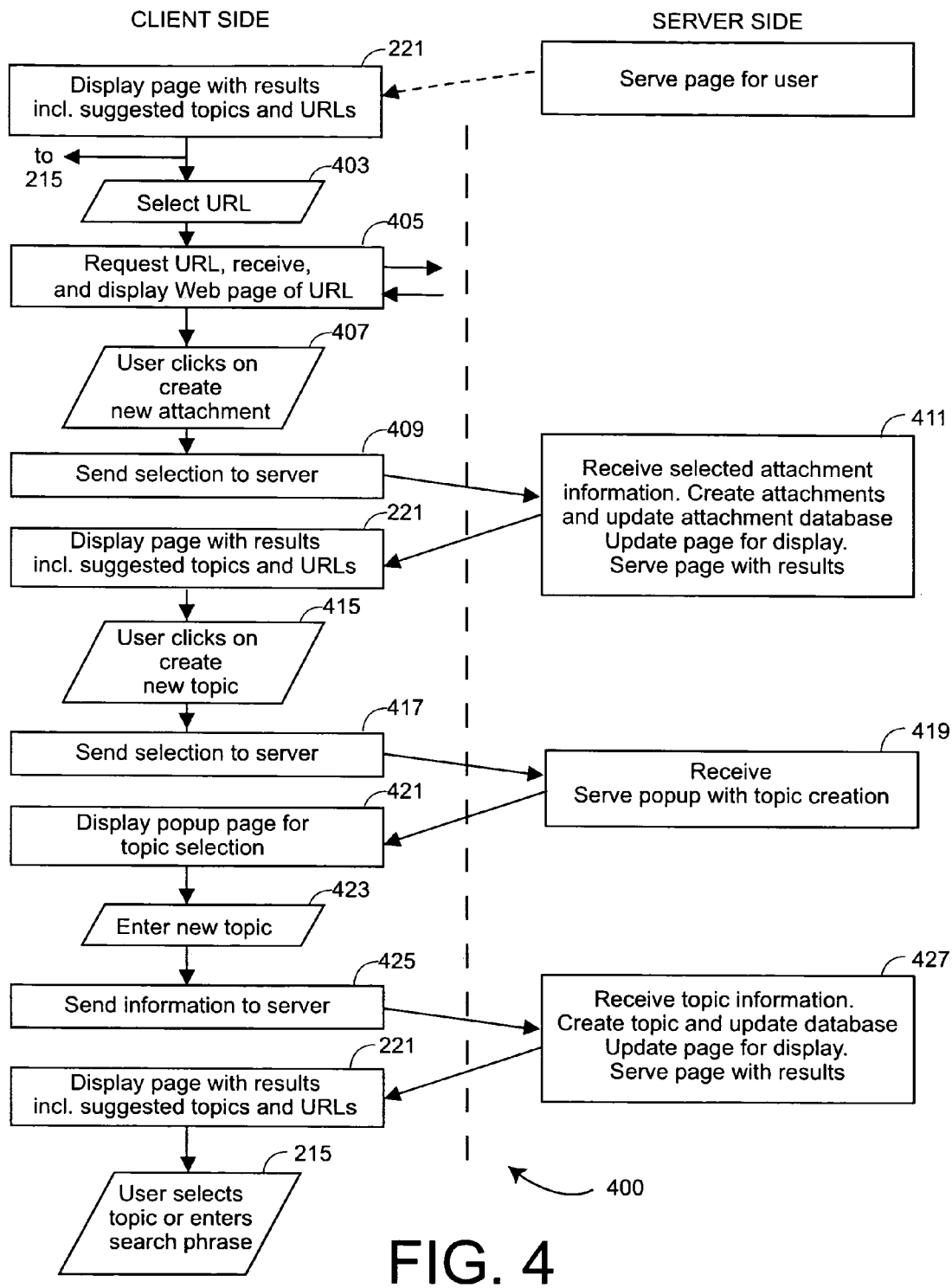
FIG. 4 shows a flowchart of a method embodiment 400 of a user providing attachment information.

FIG. 4 shows a flowchart of a method embodiment 400 of a user providing attachment information. A user can so define attachments between the same URL and a plurality of topics. Referring to FIG. 4, 221 is the same as in FIG. 2: displaying a page served by the server with the search results, including the suggested topics and the URLs of the search. In one embodiment, the Web browser includes a user-specific explorer bar or other additional panel that provides for adding an attachment between the currently displayed search topic path, and a URL. An explorer bar in this context is an additional panel usually used for favorite attachments with such Web browsers as Internet Explorer™ (Microsoft Corporation, Redmond, Wash.).

In one embodiment, the user-specific explorer bar includes a button to add the current page. FIG. 4 includes the user, in 403, selecting a page to view. In 405, the requested page information is sent to the appropriate location and the requested page is served and displayed on the main window of the Web browser. FIG. 4 shows the user in 407 clicking on a "add current page" button on the explorer bar. The user's request, including the search topic path and the page URL is sent in 409 to the server, e.g., the server 151, and on the server side, in 411, the method receives the attachment information, and creates the attachment(s) by updating the set of attachments (table 175) in the database 177, including creating an attachment between the URL and each topic in the search topic path for that user.

Note that in one implementation, the ordering of the search topic path is unimportant. That is, any URL attached to a topic path has an attachment between the URL and each topic in the set of topics of the topic path.

In another embodiment, the ordering of the attachments only matters for the particular user who defined the attachment of a URL to a complete search path, and is unimportant for all users. For that particular user, the ordering of the search path is important. See below for a description of personalized views of topics.

A new page, e.g., a user specific page with results is created and served. The page of search results is displayed (221). After that, a user may further the search by selecting a topic or entering a search phrase, or, a user may create more new attachments.

Topic Creation

As mentioned above, according to one aspect of the invention, a registered user can add a topic to the set of topics, and can add one or more URLs attached to that topic. Therefore, in one embodiment, an initial set of topics is pre-defined. In one version, this set consists of the top level topics from the Open Directory Project (ODP), also known as DMOZ, run by Netscape Communication Corporation, Mountain View, Calif. For further information, see www.dmoz.org, and http://dmoz.org/about.html.

As more and more users use the system, the set of topics grows by users creating topics. At any time, a user may create a topic and attach one or more URLs to the topic to create one or more new attachments.

Systems for users creating topics are known. See for example the above-mentioned Open Directory Project (ODP), also known as DMOZ. See also the Zeal system owned by LookSmart, Ltd. of San Francisco, Calif., and available on the Web at www.zeal.com.

When a user creates a new topic, the user at the same time or later creates one or more attachments between the newly created topic and one or more URLs.

In one embodiment, the user-specific explorer panel includes mechanisms for the user to create a new topic, e.g., by clicking on an "Add new topic" button on the explorer panel. FIG. 4 shows a user in 415 clicking on the "Add new topic" button to create a new topic. In one embodiment, this causes a popup widow to appear. The user can then enter the information in that popup window. While in one embodiment, the popup window is created locally, in another embodiment—that shown in FIG. 4, the popup window is served by the server 151. Thus, as a result of the user clicking in 415 to create a new topic, information is sent in 417 to the server. The server builds a page for the user, including a window for the user to enter the new topic, and serves the topic creation page to the user, e.g., as an additional page or popup for the user to view. In 421, the Web browser at the client displays the page for topic creation for attachments. In 423, the user inputs a topic, e.g., by typing a topic name. One embodiment includes the facility for the user to also check a box that indicates the user wishes the topic to be entered as a subtopic of the last topic in the current search topic path. See below for a further discussion of subtopics and how subtopics are used, e.g., for ranking potential refinement topics for a particular user.

In 425, the information of the new topic is sent to the server. On the server side, in 427, the method receives the new topic information, and updates the set of topics 173 in the database 177. A new page with results is created and served that includes the topic created by the user. The page of search results is displayed in 221. After that, a user may further the search by selecting a topic or entering a search phrase, or, a user may create more new attachments.

When a topic is created that resembles an existing topic of the set of topics, in one embodiment, the system automatically looks at existing topic names that are close according to a measure of closeness. If there is at least one name that is relatively very close to the newly created name, e.g., closer than a predefined threshold of closeness according to the measure of closeness, a user interface is presented to the user providing the name or names that are relatively very close. The user is requested to indicate is any of the presented names are usable, and if so, that topic is taken to be the one meant by the user.

For example, if a user submits a new topic name "tidepool" or "tidepools" or "tide pool" or "tde pool", and a topic "tide pools" already exists in the set of topics, a user interface will be presented to the user asking if "tide pools" is OK, or does the user want a new topic.

There are many measures for closeness of strings known in the art. One embodiment uses the Hamming distance, denoted dH, as a measure of the closeness between two text strings. Any letters in the source and target strings that are identical and correctly placed each contribute a distance of 0, and any that are different each contribute a distance of 1. Another measure is the Levenshtein distance, defined as the number of deletions, insertions, or substitutions required to transform one string into the other. Yet more distance measures also are known based, for example on likely transpositions based on locations on a keyboard for a particular language. For example, in an English language keyboard, "wuick" is close to "quick" because the letters "q" and "w" are adjacent. A "w" however is not next to a "q" on a French language keyboard. The type of keyboard used is known to the client machine. Such alternate string closeness measures are used, for example, in spell checking programs.

In one embodiment, a user can also add what is called a "subtopic" to a topic. For example, if there exists a topic A, a user can create a "sub topic" B of A, denoted A>B. If there is a search topic path A>B>C>D, a user may create a subtopic E to the lowest level topic, D, of the search topic path to create the subtopic D>E. In this manner, a subtopic adds an additional topic to a search topic path. Referring to FIG. 4, in one embodiment, the topic creation popup served in 419 and displayed in 421 includes a facility—a checkbox—for a user to enter a check button that indicates the user wishes the topic to be entered as a subtopic of the last topic in the current search topic path.

At the same time, or at a later time, when the user creates an attachment between a URL and the subtopic A>B, this creates an attachment between topic A and topic B. Note that while the term "subtopic" suggests a hierarchy, such a hierarchy applies only to the user. For all other searchers, there is no hierarchy of the topics A and B resulting from the subtopic A>B. Thus, for particular users, hierarchies are stored for topics of the set of non-hierarchical topics. These user-specific subtopics are used, as described below, in ranking potential refinement topics for furthering the search for presentation to the user.

Rating of Attachments and of URLs

In addition to each user being able to define topics and attachments, another aspect of the invention is that each user may rate an attachment between a URL and a topic, so that in general, an attachment can include the quadruple of information: the user, the topic, the URL, and the rating in the attachment data structure (table) 175.

In the present embodiment, only two ratings are used: a first rating ("positive") and a second rating ("negative") less favorable than the first rating. Alternate embodiments may include multiple ratings, e.g., an integer rating between 0 and 5, and in another embodiment, an integer rating between 0 and 10.

In the two-rating embodiment described herein, the attachments are stored in the database 175 as a quadruple <UserID, Topic, URL, NegRate>, where NegRate is a binary quantity that is false (value 0) for a positive rating and true (value 1) for a negative rating. Alternate embodiments store the rating using different values.

A URL viewed under a search topic path also may be actively rated by a user, and such a rating of the URL creates and rates a new user-specific attachment between the URL and each topic in the search topic path as if this is the first attachment.

Positive Rating:

In the two-rating embodiment described herein, a user positively rates an attachment by indicating that the attachment is "selected." In one version, a positive rating of an attachment is created when a user creates the attachment, and also when a user explicitly positively rates an attachment by indicating the attachment is selected.

One example of positively rating an attachment is by positively rating a URL. For example, a user viewing URLs, e.g., that are attached to one or more topics as a result of a search, may positively rate any of the viewed URLs. In the present description, so positively rating a URL is called "selecting" the URL to be in a "my URLs" list, and also called marking the URL as a "favorite" URLs. When a user so positively rates a URL, a new attachment with a positive rating is created between the URL and the topic of the search as if this is the first attachment. In one embodiment, if the search has traversed several topics such that the search has dynamically created a hierarchy—the search topic path, then an attachment is created and positively rated between the URL and each topic in the search topic path, such that a plurality of positively rated attachments are created at once. In an alternate embodiment, only the attachment between the URL and the last topic in the search topic path is positively rated. Thus, whenever a URL is marked as a favorite, a new attachment between the URL and at least one topic is created, with each such attachment including the particular user, as if this was the first user to create the attachment.

In one embodiment, an attachment marked "selected" for a particular user always precedes other attachments in a view aimed at this particular user. Thus, one aspect of the invention is providing personalized views for a user including "My pages."

Thus there may be several positively rated attachments that include a particular <URL,topic> doublet.

Negative Rating:

In the two-rating embodiment described herein, a negative rating of an attachment is created when a user explicitly negatively rates an attachment. Negatively rating is called herein rating the attachment as a junk attachment, or simply junking the attachment.

One method of negatively rating an attachment is by negatively rating a URL, e.g., a URL in a search result. Negatively rating a URL is carried out, e.g., by marking the URL as "junk." In one embodiment, after the search has traversed several topics so that a hierarchy has been created on the fly for the particular search, negatively rating a URL creates a new negatively rated user-specific attachment between the URL and the last topic of the search topic path if the search has traversed several topics. Thus, for example, suppose a user "junks" a particular URL when the search topic path is "Palo Alto/Hiking." In such a case, the attachment between the particular URL and any higher level in the search path is not negatively rated, e.g., the attachment between the particular URL and "Palo Alto" is not negatively rated, unless such a junking to such a topic was previously made.

Note that when an attachment between a URL and any topic is negatively rated, any URL under any extension of the search topic path is automatically negatively rated. Thus, if for example, a user has a subtopic "Palo Alto/Hiking," and junks a particular URL under this subtopic, then any further subtopic of "Palo Alto/Hiking" is also marked as junk for such a user, e.g., the attachment for the subtopic "Palo Alto/Hiking/Shops" is negatively rated.

Ownership

In addition to an indication of the identity of a person who rates an attachment, one embodiment includes in the database of attachments 175 an indication of the person who is first to create any attachment between a URL and a topic. Such a user is called the "owner" of such an attachment. As will be described later, users may be assigned a measure of credibility, and in one embodiment, the credibility of a particular user is a function of how well rated those attachments that are owned, i.e., that were first created by the user are rated by other users of the system. To provide for this, each attachment includes an indication that it is the first attachment created for the <URL,topic> doublet.

Thus, in one embodiment, each attachment in the attachment table 175 of database 177 has associated a quintuple of information <UserID, Topic, URL, NegRate, FirstCreated> where FirstCreated is a binary indication which is true if this is the first attachment created between the Topic and URL.

User's Favorite and Junk Topics and URLs

Another aspect of the invention is the ability of a user to rate topics and search topic paths. In one embodiment, a binary rating system is used, according to which each user has a set of associated desirable ("favorite") topics and search topic paths, and similarly, each user has an associated set of undesirable ("junk") topics and search topic paths. Of course, each of these sets may be empty if the user has not yet marked any topics as favorites or as junk. Another aspect of the invention is providing for a user a mechanism for selecting a topic and rating that topic as a favorite or as junk. In one embodiment, the suggested topics presented to a user, e.g., as a result of a search or as the initial set of topics to display includes the topics (previously) selected by a user to be favorite, and excludes any topic (previously) selected by the user as "junk." Note that a page that includes search results will also include one or more URLs that are attached to a topic marked as junk if such URLs are also attached to other topics in the search topic path, or if such URLs are the result of a search for a search phrase.

Favorite URLs.

As described above, each attachment may be positively or negatively rated by a user. Thus, a user may further have a list of associated ("favorite") attachments. These are attachments that the user has positively rated.

As described above, when a user views a search result, one aspect of the invention is that the user interface provides for the user a mechanism to select a displayed URL to be a "favorite" URL. As described above, so selecting a URL to be a favorite URL creates a positively rated attachment between the URL and each topic in the search topic path.

Similarly, one aspect of the invention is that the user interface provides for the user a mechanism to select a displayed URL to be a "junk" URL. As described above, so selecting a URL to be a junk URL creates a negatively rated attachment between the URL and the last topic in the search topic path.

In one aspect of the invention, when viewing a topic, a user will not see any URLs attached to any topic marked as junk by the user. The user, however, may still see such URLs of such junk-marked attachments if the URLs are also attached to other topics of the search topic path, or if they are the result of a free search query. Therefore, suppose a URL has negatively rated attachments to a search topic path, and thus to a subset of the set of topics. Such a URL will also be considered junk to any superset of the search topic path.

Overall Attachment Quality

Thus, as described above, there may be many attachments between a URL and a topic, and each such attachment may have a different rating, depending on how individual users have rated the attachment. One aspect of the invention is defining an overall quality measure of the relationship between a URL and a topic that reflects how users rate the attachments between the URL and the topic. The quality measure is calculated according to an overall attachment quality calculation method that, in one embodiment, provides a comparison of the relative number of users who positively rate the attachment to the relative number of users' who negatively rate the attachment. In one embodiment, the overall attachment quality calculation method may be expressed by a quality calculation formula.

In one embodiment, the overall attachment quality calculation method is as follows. The quality measure is between 0 and 1. Initially, each attachment is assigned a quality of ½. If one or more users positively rate the attachment and no users negatively rate the attachment, the attachment takes on the value 1. If one or more users positively rate the attachment, and typically, there is at least one such user—the user who defines it, then the topic attachment quality is never 0, unless there is only the user who created the attachment who later rates the attachment negatively.

In general, for a universe of URLs denoted $URL_1$, $URL_2$, $URL_i$, ..., and a set of topics denoted $A_1$, $A_2$, $A_j$, ..., denote by <ij> an attachment between $URL_i$ and $A_j$. Denote by $NumPos_{ij}$ the number of users who positively rate the attachment <ij>, and denote by $NumNeg_{ij}$ the number of users who negatively rate the attachment <ij>. Denote by $Num_{ij}$ the total number of users who rate attachments with the pair <i,j> in any way, i.e., $Num_{ij} = NumPos_{ij} + NumNeg_{ij}$. Denote by $Q_{ij}$ the overall quality of the attachments with the pair <ij>. Then in one embodiment, $$Q_{ij} = [½ + ½ * (NumPos_{ij} - NumNeg_{ij})/Num_{ij}],$$

where * indicates multiplication.

The overall quality of the attachments with the pair <ij> is such that initially, and so long as no user negatively rates an attachment, the attachment has a quality measure of 1.

In other alternate embodiments, positive and negative attachments are weighted differently. For example, let $\alpha_+$ and $\alpha_-$ be the relative weights for positive and negative attachments, with $$\alpha_+ + \alpha_- = 1.$$

Then in another alternate embodiment, $$Q_{ij} = [\alpha_- + (\alpha_+ * \text{NumPos}_{ij} - \alpha_- * \text{NumNeg}_{ij})/\text{Num}_{ij}].$$

This reduces to the first alternate embodiment when $\alpha_+ = \alpha_- = \frac{1}{2}$

User Credibility and Contribution Index

Another aspect of the invention is the assigning of each user of a measure of credibility. This, for example, provides for an alternate measure of overall quality of an attachment that is dependent on user credibility, in that more credible user's ratings have more effect on the attachment quality than less credible users.

In one embodiment, the credibility measure for a user is a measure of how many other users positively rate the topics first created by a user. The measure of credibility thus provides an indication of how credible each user is in defining topics and in rating attachments. In yet another embodiment, the measure of credibility is further influenced by a contribution index that indicates how much the user has contributed to the system, in terms of the number of original attachments the user has created for the system.

For any user, denote by $\text{NumCreated}_{UserId}$ be the number of attachments that a user UserID has created for the system, i.e., for a user UserID, the number of attachments in which User ID is the user, and for which FirstCreated is true.

Let $Q_k$, k=1, 2, . . . , $\text{NumCreated}_{UserID}$ be the respective qualities of the attachments first created by the user UserID.

In a first embodiment, the "raw" credibility of the user UserID, denoted $\text{RawCred}_{UserID}$ is defined as the average quality of the attachments provided to the system by the user. That is:

$$\text{RawCred}_{UserID} = (\Sigma_k Q_k)/\text{NumCreated}_{UserID}.$$

It is desirable that a user contribution index takes into account the number of attachments a user creates, either as first attachments, or by rating an attachment as positively or negatively.

One version of a contribution index is as follows:

Denote by $\text{NumCreated}_{Ave}$ the average number of attachments per user contributed by all users from the 10th through the 90th percentile in terms of contribution, i.e., the average number of attachments over all users other than those whose $\text{Num}_{UserID}$ is in the top 10% and the bottom 10%.

For a particular user, say the user UserID, denotes the number of attachments the user has defined by $\text{NumCreated}_{UserID}$. If that a user has contributed at least NumAttachAve attachments, let that user have a high contribution index, e.g., a "full" contribution index. If that user has contributed less than the average per user contribution, the contribution index is "slowly" reduced. In one version, the contribution index is reduced logarithmically.

Denote by $\text{Contr}_{UserID}$ the contribution index of the user. Then in one embodiment, $$\text{Contr}_{UserID} = \log[\min(\text{NumCreated}_{UserID}, \text{NumCreated}_{Ave})]/\log[\text{NumCreated}_{Ave}].$$

In one embodiment, the overall credibility of a user is the credibility of that user weighted by the user's contribution index. Denote by $\text{Cred}_{UserID}$ the overall credibility of a user that includes both how the user's attachments are rated and the relative contribution of the user. Then $$\text{Cred}_{UserID} = \text{RawCred}_{UserID} * \text{Contr}_{UserID} = \text{RawCred}_{UseID} * \log[\min(\text{NumCreated}_{UserID}, \text{NumCreated}_{Ave})]/\log[\text{NumCreated}_{Ave}],$$

such that a user's contribution index is related to the user's raw credibility if the user contributes more than the average per user, and related to the user's raw credibility logarithmically weighted down by the relative number of contributions if the user has the same or fewer contributions than the average.

In one embodiment, the user credibility measure internally is a number between 0 and 1.

Determining "Refinement" Topics and "Similar" Topics to be Displayed while Searching The determining of the refinement and of the similar topics is now described by way of example. In the example, denote by S the search phase being searched for. Denote by P the search topic path. For example, suppose a user runs a search on search phrase S and the search has been refined to be under topic A and then under topic B. Then P=A>B. The search method includes identifying information items that have an attachment to the search topic path, and that satisfy the search phrase, if any. These identified information items—the URL search results—are in the form of a set of URLs. Denote the set of identified information items—this set of URLs as {S:P}, denoting the URLs that are "pseudo-attached" to the search phrase S, which may be empty, and that are attached to search topic path P, i.e., to all the topics in the search topic path P. An empty search phrase S means that the URL search results are all the URLs in attachments to each of the topics of the search topic path. P=A>B for example means that each URL in the set {S:P} with P=A>B has at least one attachment to each topic in the search topic path, e.g., to topic A and to topic B.

Determining the Set of Refinement Topics

The refinement topics are determined according to a refinement topic criterion using a refinement selection method. The refinement topic criterion in one embodiment may be a combination of individual criteria. The invention is not restricted to any one refinement topic criterion and associated refinement selection method. In one embodiment, according to a first refinement topic criterion and associated refinement selection method, a potential refinement topic is a topic that has an attachment to at least one of the identified information items, e.g., to at least one URL in {S:P}. Thus, if P=A>B, C is a refinement topic of {S:P} if {S:A>B>C} is not empty.

The refinement selection method selects potential refinement topics. Another aspect of the invention is that the refinement selection method includes a refinement ranking method that ranks potential refinement topics. Such a refinement topic ranking method is used to determine which of two potential refinement topics is the better refinement topic. In one embodiment, the refinement topics are presented, e.g., in the page served to a searcher, ordered according to the refinement rank.

One—a first—refinement ranking method, for each potential refinement topic, determines a refinement measure as the number of members of {S:P} that are in attachments to the potential topic as a percentage of the size of {S:P}, denoted |{S:P}| and being the number of URLs in {S:P}. According to the first ranking method embodiment, the best potential refinement topic is that whose refinement measure is closest to 50%. A refinement topic whose refinement measure is 50% would split the results into two equal-size sets of URLs. The next best refinement topic is that whose refinement measure is next closest to 50%, and so forth.

The first refinement ranking method lists any attachment between a URL to a topic once only. Thus, all attachments between a topic and a URL are counted once. In another embodiment, a quality measure is provided as a measure of the quality of each attachment. In one version, there may be more than one attachment between a URL and a topic, e.g., by a user making an attachment that may already exist. See below for users adding attachments. One quality measure to use is that the quality measure of an attachment that is proportional to the number of attachments between the same URL, topic pair.

A second ranking method takes into account the rating of attachments by users of the system. Recall that one aspect of the invention is providing an overall measure of quality of the attachment between a URL and a topic. The second ranking method includes, for each potential refinement topic, determining a refinement measure as the sum of overall qualities of all attachments of the potential topic and any members of $\{S:P\}$ as a proportion, e.g., a percentage of the total quality measures of all attachments of $\{S:P\}$. According to the second ranking method embodiment, the best potential refinement topic is that whose refinement measure is closest to 50%. The next best refinement topic is that whose refinement measure is next closest to 50%, and so forth.

In one embodiment, the 10 best (or some other pre-selected number) of refinement topics is displayed, sorted alphabetically, or some other way, with any refinement topics that are also favorite topics of the user displayed in some highlighted manner.

According to yet another embodiment, a third ranking method is used that like the first method, also determines a refinement measure for each potential refinement topic according to the number of URLs in $\{S:P\}$ that are in attachments to the potential refinement topic in relation to the number of URL results (the size of $\{S:P\}$), in general, the number of information items in the results. According to the third raking method, the refinement measure is the sum of the squares of 1) the number of identified information items that are in attachments to the potential refinement topic in relation to the number of URLs in $\{S:P\}$ and 2) the number of URLs in $\{S:P\}$ that are not in attachments to the potential refinement topic in relation to the number of URLs in $\{S:P\}$. The third ranking method ranks the potential topics in inverse to the refinement measure. The best potential refinement topic is the one with the least refinement measure, the next best is the one with the next lowest refinement measure, and so forth.

According to yet another embodiment, a fourth ranking method is used that like the second method, also determines a refinement measure for each potential refinement topic according to sum of quality measures of attachments from the URL results to the potential refinement topic in relation to the sum of qualities of attachments involving URL results. According to the third ranking method, the refinement measure is the sum of the squares of 1) the sum of overall quality measures of all attachments from $\{S:P)$, i.e., the information items in the results to the potential refinement topic in relation to the number of identified information items and 2) the sum of overall quality measures of all attachments from the results, i.e., $\{S:P\}$ to topics other then the potential refinement topic in relation to the sum of overall quality measures of all attachments from $\{S:P\}$. The fourth ranking method ranks the potential topics in inverse to the refinement measure. The best potential refinement topic is the one with the least refinement measure, the next best is the one with the next lowest refinement measure, and so forth.

In one embodiment, in the case a search phrase is entered, and there is also a topic that exactly matches the search phrase, the results are presented as if that topic was selected. In another embodiment, the results also present that topic as a refinement topic, in one version, as the first refinement topic even if that topic is not the "best" refinement topic according to the refinement topic ranking method.

As described earlier, also displayed for a registered searcher (a user) are the favorite topics of the user. If any of the refinement topics are also in the user's set of favorite topics, such favorite refinement topics are presented on the served page displayed in some highlighted manner, e.g., with a start appearing next to the topic, or, in an alternate method, in a boldface or otherwise emphasized display font.

When a user has defined subtopics, that is a pair of topics that have a hierarchy for the particular user, then one embodiment of the refinement topic ranking method uses such subtopic hierarchies. For example, consider a search topic path ending in topic A, and suppose both C and D are potential refinement topics. According to one embodiment of the invention, the refinement topic ranking method ranks C over D if more users have the subtopic A>C than A>D.

Determining the Set of Similar Topics

The similar topics are determined according to a similarity topic criterion. The invention is not restricted to any one similarity topic criterion.

A first similarity topic criterion is now described. Consider a topic D, and suppose that D has attachments to a number, denoted $x_D$, of the URLs in set $\{S:P\}$. Define as $\{>D\}$ the set of URLs that each have a positively rated attachment to topic D. Denote by $|\{>D\}|$ the number of URLs that have positive attachments to D. The topic D is a refinement topic of $\{S:P\}$ if $x_D \geq 33\%$ of $|\{S:P\}|$) and furthermore, if $|\{>D\}|$, the number all URLs that have positive attachments to topic D, is not greater that three times $x_D$.

According to a first method of ranking topic similarity, the best similar topic is one for which $x_D=50\%$ and $|\{>D\}|=2x_D$. The next best is the one for which the sum of ratios $(x_D-50\%)^2+((|\{>D\}|-2x_D)/D)^2$ is minimal.

According to an alternate embodiment, a second method of determining and ranking similar topics is as follows.

Consider the set $\{S:P\}$. D is a similar topic if:
1) there is a topic E in the set of topics such that $\{>E\}$ includes all of $\{S:P\}$, and $|\{>E\}|$ is not too large, e.g., $|\{>E\}|$ is note greater than three times $|\{S:P\}|$;
2) $\{>E\}$ also includes in $\{>D\}$; and
3) $\{>D\}$ is at least half the size of $|\{S:P\}|$.

According to this second method, a first similar topic denoted D1 is ranked higher than a second similar topic denoted D2 if $$|\{>E\}-(\{S:P\}\cup\{>D1\})|<|\{>E\}-(\{S:P\}\cup\{>D2\})|,$$

where "−" denotes set subtraction, and "∪" denotes the union. Thus, D1 is ranked higher than D2 if the number of attachments in $\{<E\}$ is closer to the number of attachments in the union of $\{>D1\}$ and $\{S:P\}$ than in the union of $\{>D2\}$ and $\{S:P\}$.

Display

Another aspect of the invention is the user interface displayed to the user for searching, and as a result of searching.

In one embodiment, the results of a search include the results of searching a search phrase in the case a phrase was provided, and further the results of selecting a topic, but may also be the results of viewing the URLs that have attachment to a selected topic, or set of topics in the case of a search topic path.

When displaying URLs in a search, the URLs associated with the user are displayed first, in a reverse order to the path. The "selected" URLs are marked, e.g., with an adjacent star. For example, if the topic path is A>B>C, those URLs that are associated with the user and that have attachments to C, are displayed before those to with attachments to B, and those with attachments to B are displayed before those with attachments to A.

In one embodiment, URLs that have attachments rated as junk by the particular user are not displayed at all to the user.

User Information

In one embodiment, when a user logs on the system, the overall credibility of the user is provided to the user. The different components of the overall credibility measure, e.g., the contribution index, and the raw credibility of the user are maintained for use by the system in the user database table 179.

While internally, a numerical measure is maintained for each user's overall credibility in the user table 179 of database 177, e.g., as a measure indicated by a number between 0 and 1, for display purposes, a more intuitive measure is used. One embodiment uses a letter grade, e.g., a grade of the set of letter grades A+,A,A−,B+,B,B−,C+,C,C−,D+,D, and D−. In another embodiment, a star system is used. Other alternate embodiments use an alternate mechanism of visually providing an easily understood measure of credibility.

The User Interface

Another aspect of the invention is a user interface for a collaborative search engine and search method for searching for URLs guided by a not-necessarily-hierarchical set of topics. One aspect of the invention is a method of presenting a first user interface display to a searcher that includes provision for the searcher to input a search phrase, and for the searcher to indicate that the searcher is a user, e.g., by providing the User ID.

Figure 5:
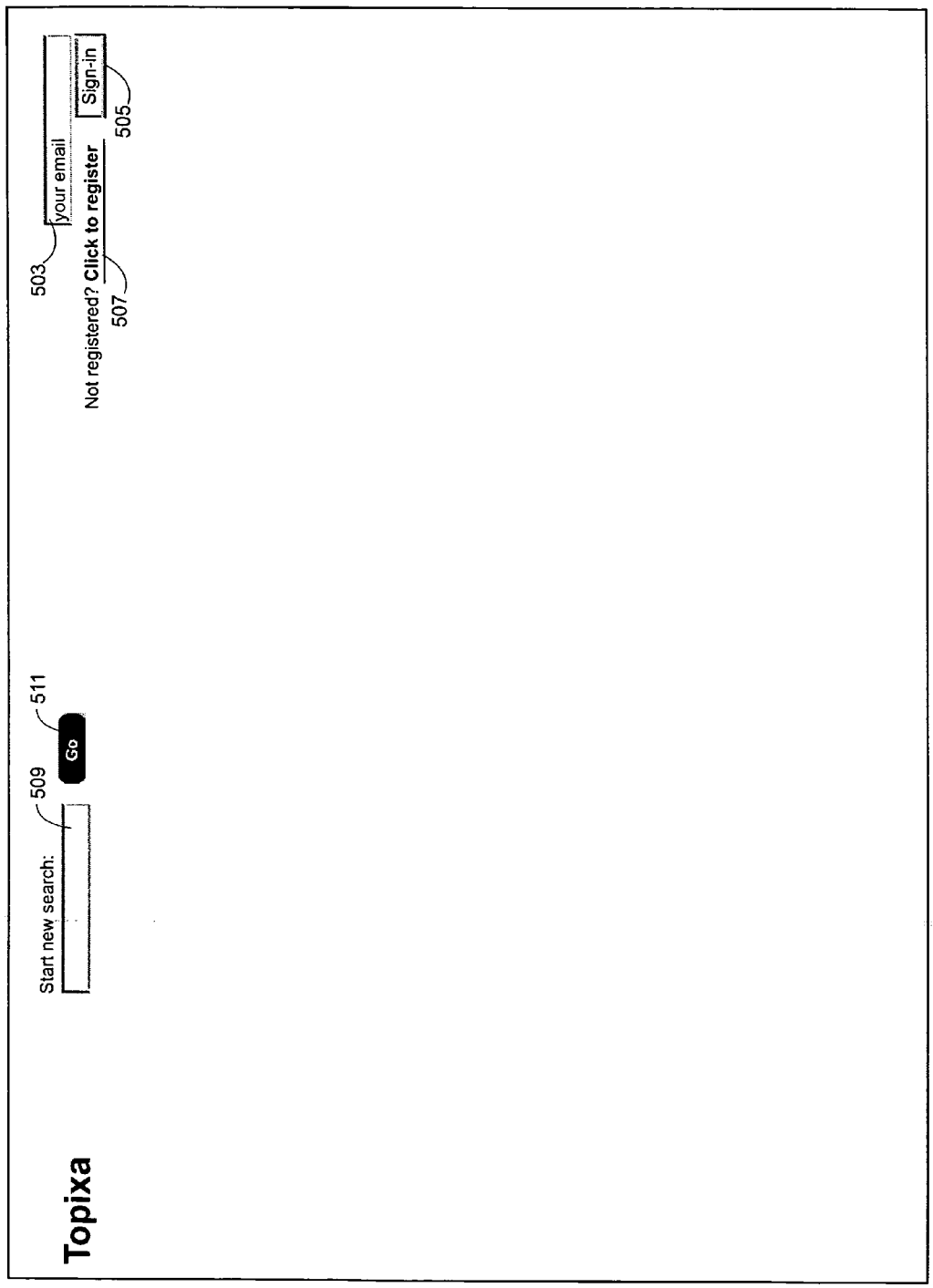
FIG. 5 shows an embodiment of an initial user interface display that includes a window for a user to enter the user ID, e.g., as an email address, and a button to indicate that user information has been entered, and that further includes provision for a searcher to enter a search phrase.

FIG. 5 shows an initial user interface display 500. Included is a window 503 for a user to enter the user ID, e.g., as an email address, and a button 505 to indicate that user information has been entered. The user interface display 500 includes provision 507 for a searcher who is not a user to enter registration information. Clicking on the "Click to Register" 507 causes the server to serve a registration page. The searcher enters registration information. The registration information is sent to the server, and as a result, the user table 179 in database 177 is modified. A user-specific page is now served and replaces the initial page 500.

Continuing with FIG. 5, the initial user interface display 500 includes provision in the form of a window 509 and a button 511 for a searcher to enter an initial search phrase.

In another embodiment, the initial page includes an initial subset of the set of topics.

The user enters a search phrase, or, in the embodiment in which an initial subset of topics also was presented in the first presented user interface display, one of the topics. As a result, another aspect of the invention is presenting a second user interface display to the searcher that results from the user selecting the search phrase—or, in the case that an initial subset of topics also was presented in the first presented user interface display, one of the topics. The second user interface display includes the results of the search in the form of URLs that are the result of the search for the search phrase (or that are attached to the topic if a topic was selected, for the embodiment that included initially presenting a subset of topics). The second user interface includes a set of suggested topics selected from the set of topics to aid the user in furthering the search. In one version, the second subset includes one or more topics that refine the search selected from the set of topics according to a refinement topic criterion. In another version, the second subset includes one or more topics that are related to the URLs that are the result of the search. The user interface provides the searcher with provision for selecting one of the topics, e.g., by clicking on the presented topic.

The searcher may now continue the search by either providing a search phrase, or by selecting one of the suggested topics. This results in a new second user interface with new URLs that are the result of the search, and a new set of suggested topics, including refinement topics. The user can now continue. As a result, a hierarchy of topics is determined on the fly for the searcher for the particular search as a result of the topics selected by the searcher.

As an example, suppose that a searcher is interested in hiking trails in Half Moon Bay, Calif. Initially, the searcher enters "Half Moon Bay" as a search phrase. Suppose the set of topics includes a topic "Half Moon Bay."

In one embodiment, in the case a search phrase is entered, and there is also a topic that exactly matches the search phrase, the results are presented as if that topic was selected. Thus, because there is a topic that exactly matches the search phrase, the search results are as if the searcher had selected the topic "Half Moon Bay." A set URLs and of refinement topics is presented under the topic "Half Moon Bay." As a result, a set of refinement topics and search results of URLs that are attached to the topic "Half Moon Bay" are presented. As might be imagined, these include hotels in Half Moon Bay, and other information related to "Half Moon Bay." The suggested refinement topics therefore may include California, Accommodation, and so forth. Suppose the refinement topics include the topic "Things to do." Suppose further that the searcher selects this as the next topic, and then again a set of URLs and a set of suggested topics, including refinement topics are presented. Suppose that the refinement topics include the topic "Whale watching," "Bird Watching," "Fishing," "Hiking", and so forth. The searcher, being interested in hiking trails, selects "Hiking." Suppose that as a result, there are URLs and a set of suggested topics, and suppose that one of the suggested topics is "Trails." Suppose the user selects "Trails."

Figure 6:
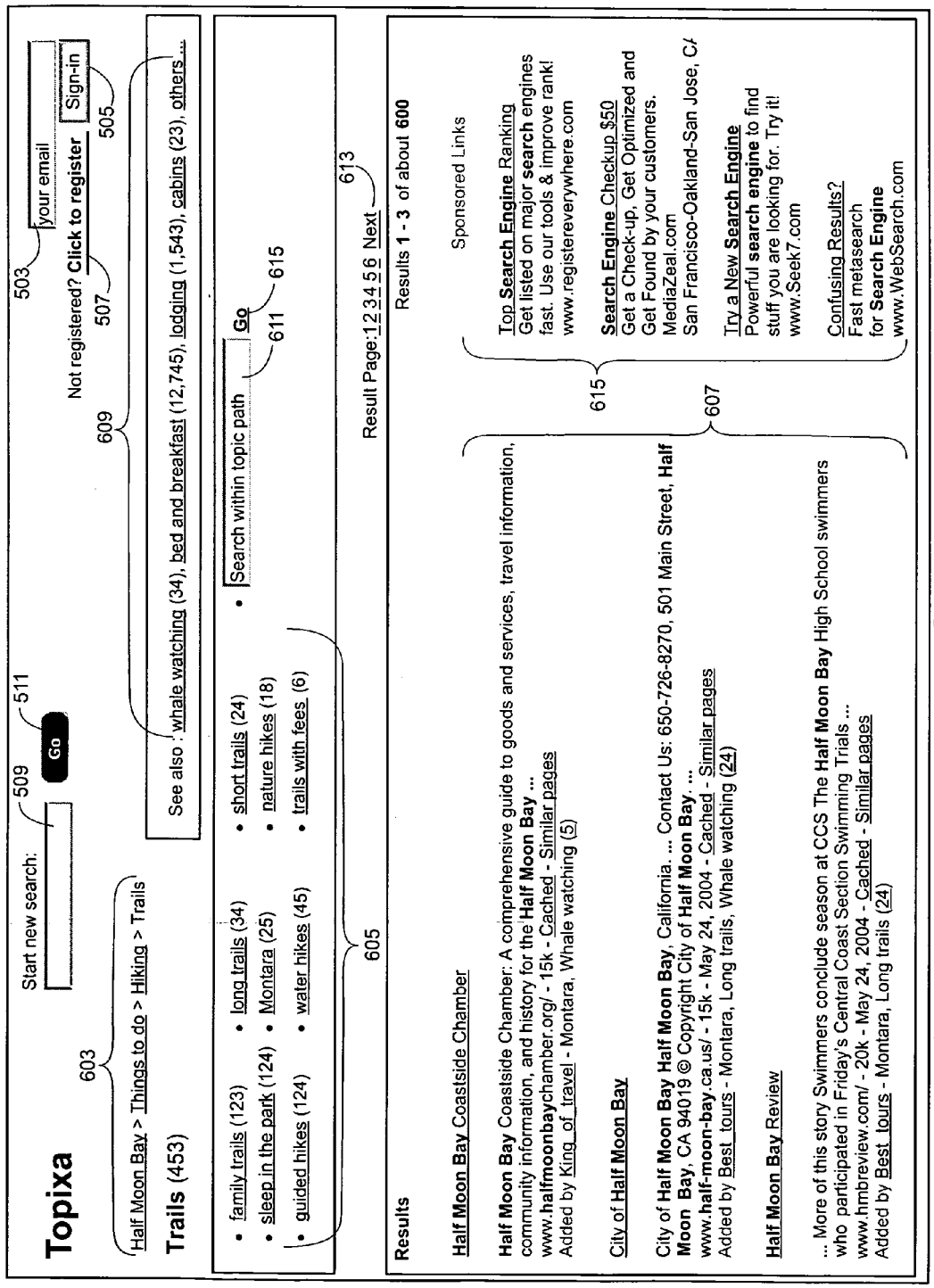
FIG. 6 shows an embodiment of a second user interface display that might result at a stage of a multi-stage search for an exemplary search by a searcher who is not necessarily a user.

FIG. 6 shows the second user interface display 600 that might result at this stage of the search for this example. The presented user interface display includes an indication of the search topic path 603, in this case "Half Moon Bay>Things to do>Hiking>Trails." The presented user interface display further includes the results 607, in this case, the first three URLs of a total of 600 URLs that are in the system. For each result, a title and a short description is provided in the display, attached to the URL such that the searcher selecting (clicking) on any of the displayed results causes the Web page defined by the URL to be displayed. In the case of FIG. 6, the number of URLs in the results is such that several pages are required to show all the URLs of the results. The presented user interface display includes an indication 613 of which page of a multi-page results is being displayed, and also produces a mechanism to select one of the other pages, and a mechanism to display the next page. If the page displayed is other than the first page, a mechanism also is displayed for selecting the previous page.

The presented user interface display also includes a set of suggested topics in the form of a set of refinement topics 605. In one embodiment, including that shown in FIG. 6, a set of similar topics 609 also is displayed with a mechanism for the searcher to select one of the similar topics to replace the search topic path. In one embodiment, the number of URLs under each of the suggested topics also is displayed.

One embodiment of the presented user interface display further includes a mechanism for the searcher to provide an additional search phrase to search for within the search topic path. In FIG. 6, this is in the form of a text window 611 within which the user can enter the search phrase, and a button 615 to initiate the next step in the search.

Note that an alternate embodiment further shows not only results of a search in the system, e.g., of URLs that have at least one attachment to each topic in the search topic path, but also the results of a Web search. Note also that in the shown embodiment, sponsored links 615 are displayed. In other alternate embodiments, additional links also are included.

The presented user interface display of FIG. 6 also includes a mechanism for the searcher to start a new search, and also includes a mechanism for the searcher to sign in if the searcher is a user. That is, the presented user interface display of FIG. 6 includes the mechanisms of the first presented user interface display of FIG. 5.

Suppose, as an example, the user signs in at this stage, or suppose the user signed in at an earlier stage, and similarly reached the search topic path "Half Moon Bay>Things to do>Hiking>Trails."

When a user signs in, the user ID is sent to the server, and the server determines if the potential user is registered. If indeed the searcher is a user, the server serves a modified page that includes user-specific information. Thus, another aspect of the invention is a method of presenting a third user interface display to a searcher who is a user that includes user-specific information.

Figure 7:
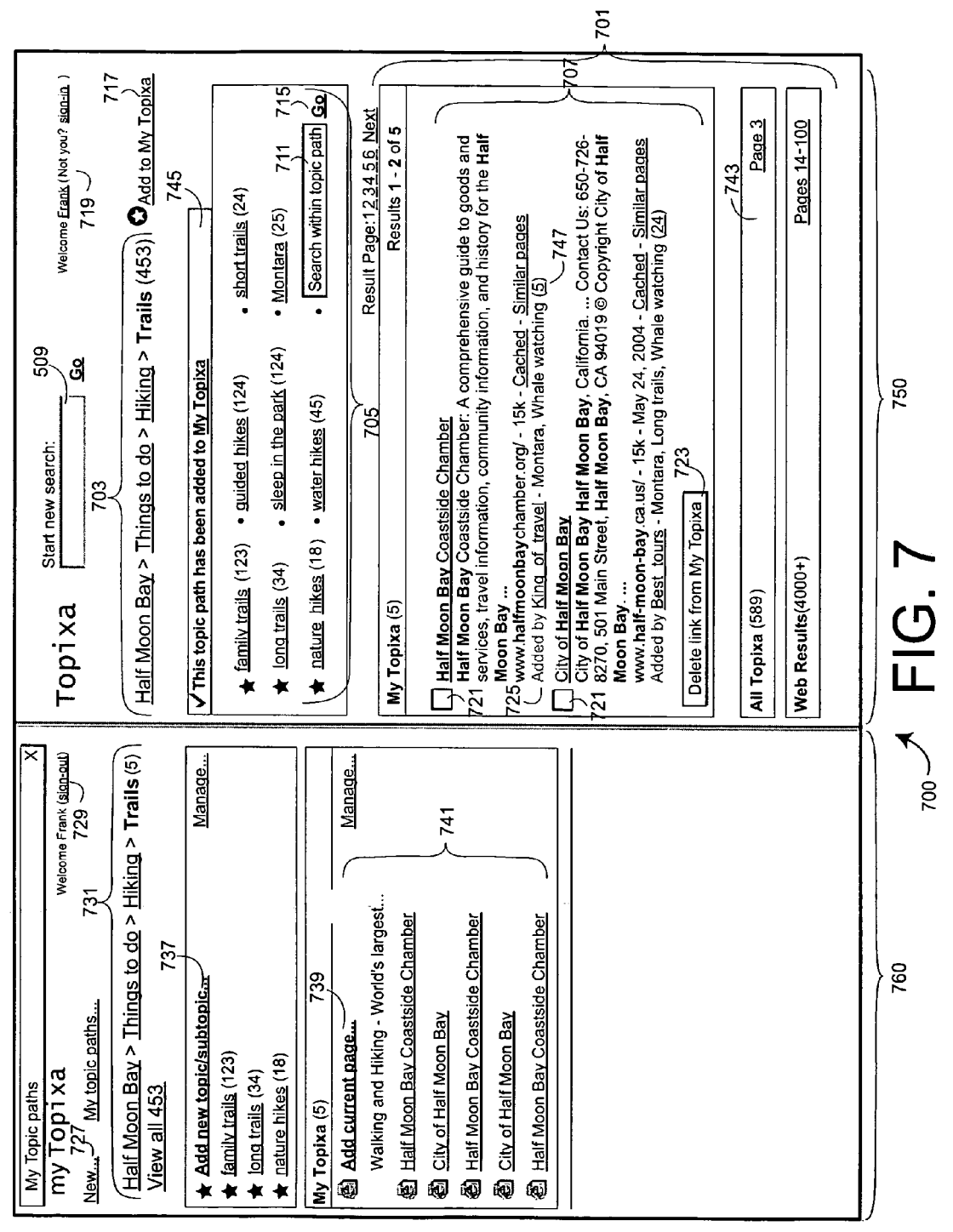

FIG. 7 shows the third user interface display 700 that might result at this stage of the search for this example. The presented user interface display 700 includes a main display area 750 and a user-specific explorer bar (or other additional window) 760. The presented user interface display 700 includes an indication 719 of the current user, in this example as a Welcome message with a username selected by the user during registration. Provision is also provided for the user to indicate, e.g., by signing in, if the usemamme shown is of a different user. Sign-out provision 729 also is provided, in this example in the explorer bar 760, for the user to sign out.

The main window 750 of the presented user interface display includes a modification of the results shown in FIG. 6, but in a user specific manner. For example, the main window 750 includes an indication of the search topic path 703, in this case again "HalfMoon Bay>Things to do>Hiking>Trails." In one embodiment, a provision to add the current search topic path to a stored set of the user's favorite search topic paths is included, in this embodiment as a clickable object 717 labeled "Add to My Topixa" or similar designation, where in this example, "My Topixa" is a user's user specific information, such as the user's favorite topics, positively rated attachments, and other user specific information. In one embodiment, the main window 750 also includes a message area 745, which in the example shown contains the message "This topic path has been added to My Topixa." Such a message would result, for example, after the user clicks on the clickable object 717 to make the current search topic path 703 a favorite.

In one embodiment, the main display window 750 of the presented third user interface display 700 further includes the URL results 701, in this embodiment, in three different presentations. The first includes the positively rated, e.g., "favorite" results, that is, those URLs that have attachments to the topic(s) of the search topic path that the user has "selected" to be included as the user's "Favorite" attachments. The second list 743 is of the overall results, e.g., the URLs presented in list 607 of FIG. 6. In one embodiment no results that the user has selected as "junk" are included. That is, in one embodiment, those "junked" URLs are not shown in the second list 743. Thus, in this example, the list of overall results has fewer URLs than the results 607 of FIG. 6.

As in the case of FIG. 6, the number of URLs in the results is such that several pages are required to show all the URLs of the results. The main window 750 of the presented user interface display 700 includes an indication of which page of a multi-page results is being displayed, and also includes a mechanism to select one of the other pages, and a mechanism to display the next page. If the page displayed is other than the first page, a mechanism also is displayed for selecting the previous page.

FIG. 7 shows the favorite URLs in detail. For each result, a title and a short description is provided in the display, linked to the URL such that the searcher selecting (clicking) on any of the displayed results causes the Web page defined by the URL to be displayed. In one embodiment, an identifier 725 of the user who first defined the attachment of the URL is also presented. Also displayed is credibility 747 of the user by the system.

In one embodiment, the main window 750 of the presented user interface display 700 includes in the favorites results 707 a provision to "junk" one or more of the results, e.g., in the form of a check window 721 and a "junk" button 723 appropriately marked with "Delete link from My Topixa," where "My Topixa" is the list of favorite attachments under the search topic path. Checking any result(s) and clicking on a provided button 723 negatively rates the attachments of the marked URLs to the search topic path.

Selecting the first page, of the overall results, in this example page 3, by clicking on the overall results 743 similarly produces the first page of the overall results. In such a case, in one embodiment, the main window 750 of the presented user interface display 700 includes in the overall results a provision to select one or more of the results, e.g., in the form of a check window and an "add to favorites" button appropriately marked, e.g., with "Add to My Topixa" or similar annotation. Checking any result(s) and clicking on a provided button positively rates the attachments of the marked URLs to the search topic path.

In one embodiment, the main window 750 of the presented user interface display 700 includes results of searching the Web for the terms in the search topic path.

The main window 750 of the presented user interface display 700 also includes a set of suggested topics in the form of a set of refinement topics 705. In one embodiment, the number of URLs under each of the suggested topics also is displayed. One embodiment of the presented user interface display window 750 further includes a mechanism for the searcher to provide an additional search phrase to search for within the search topic path. In FIG. 7, this mechanism is in the form of a text window 711 within which the user can enter the search phrase, and a button 715 to initiate the next step in the search.

In one embodiment, the set of refinement topics is presented with an indication of which of the suggested topics are the user's favorite topics. In FIG. 7, a star is shown in the list 705 to indicate the favorite suggested topics. Furthermore, the ordering is such that the favorite suggested topics are presented before the other suggested topics. In the example shown in FIG. 7, three of the suggested refinement topics: "family trails," "long trails," and "nature hikes" are favorites, e.g., have previously been selected as favorites by this user. Therefore, the order of the suggested refinement topics 705 in FIG. 7 may, and in this example does, differ from the order of the suggested refinement topics 605 of FIG. 6.

In one embodiment, the presented user interface display 700 includes a user-specific explorer bar 760 (or similar panel) that provides user specific information. In one embodiment, the present search topic path is displayed 731 if such a search topic path was made favorite. In an alternate embodiment, the present search topic path is displayed 731 even if such a search topic path was not made favorite. A clickable object is provided for displaying and managing all favorite search topic paths, and a clickable object, here labeled "New . . ." 727 is provided for adding a new search topic path as a favorite search topic path.

In one embodiment, the explorer bar (or similar panel) 760 includes a list 741 of the user's favorite attachments for the present search topic path. The explorer bar (or similar panel) 760 further includes a clickable object 739, labeled in FIG. 7 as "Add current page" for adding an attachment between the currently displayed search topic path, and the Web page displayed in the main window 750. Thus, a user selects a Web page by clicking on one of the results 701. This causes that URL to be served and displayed in the main window 750. A user now clicking on the clickable object 739 causes information to be sent to the server that adds attachments between the URL displayed in the main window and each topic in the currently displayed search topic path 731.

Thus, a mechanism is provided for the user to rate the quality of any attachment between a displayed search result and the search topic path.

In one embodiment, the explorer bar (or similar panel) 760 of the presented third user interface display includes provision for the user to add a topic or subtopic. In the version shown, the provision is in the form of a clickable object 737 that when invoked, causes the server to serve a popup page for adding a new topic, or a subtopic to the presently displayed search topic path, e.g., to the last topic in the search topic path. Each new topic or subtopic becomes a favorite for the particular user.

Figure 8:
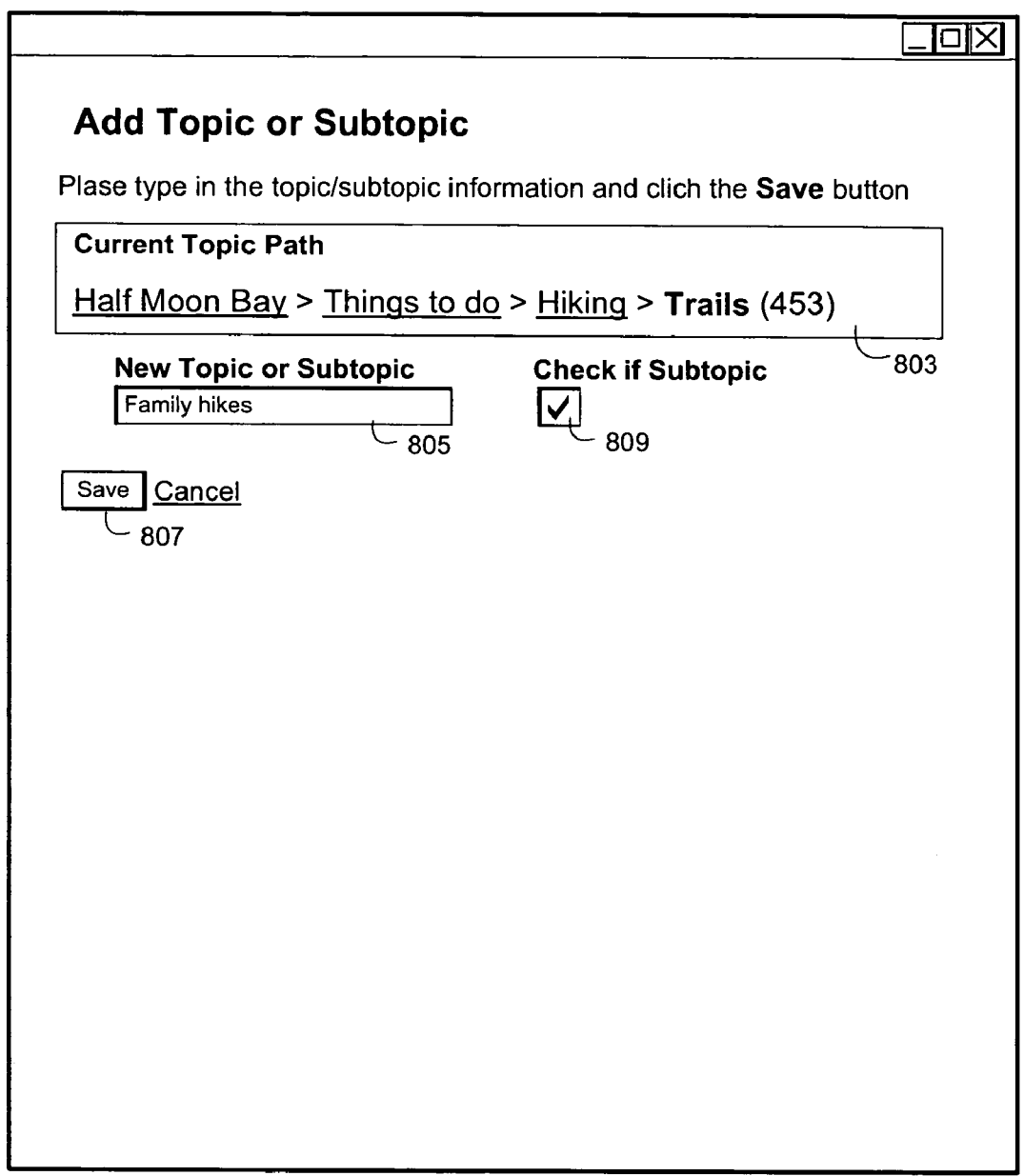
FIG. 8 shows an embodiment of a user interface display that includes provision for a user to define a new topic.

FIG. 8 shows one embodiment of a popup window 800 served as a result of a user clicking the "Add new topic/subtopic . . ." object 737 in the explorer panel 760 in FIG. 7. In one embodiment, the popup window 800 includes a display 803 of the current search topic path, and a mechanism, in this case a fillable text window 805 and a button 807, shown labeled "Save" for the user to enter a new topic or subtopic. A checkbox 809 is provided for the use to indicate if the new topic is to be added as a subtopic for the user to the last topic in the search topic path—the topic "Trails" in the example shown. The popup window 800 also includes a clickable object to cancel the adding of a topic or subtopic.

Thus has been described a method for searching, guided by a set of not-necessarily hierarchical topics.

Unless specifically stated otherwise, as apparent from the following discussions, it is appreciated that throughout the specification discussions utilizing terms such as "processing," "computing," "calculating," "determining" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one embodiment, performable by a machine which includes a one or more processors that accept computer-readable (also called machine-readable) code containing instructions. For any of the methods described herein, when the instructions are executed by the machine, the machine performs the method. Any machine capable of executing a set of instructions (sequential or otherwise) that specify actions to be taken by that machine are included. Thus, one a typical machine may be exemplified by a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. If the processing system requires a display, such a display may be included, e.g., an liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein also encompasses a storage system such as a disk drive unit. The processing system in some configurations may include a sounds output device, and a network interface device. The memory subsystem thus includes a carrier medium that carries computer-readable code (e.g., software) including instructions for performing, when executed by the processing system, one of more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute carrier medium carrying computer-readable code.

In alternative embodiments, the machine operates as a standalone device or may be connected, e.g., networked to other machines, in a networked deployment, the machine may operate in the capacity of a server or a client machine in server-client network environment, or as a peer machine in a peer-to-peer or distributed network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while some diagram(s) only show(s) a single processor and a single memory that carries the computer-readable code, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer program that executes on a processing system, e.g., a one or more processors that are part of a search server. Thus, as will be appreciated by those skilled in the art, embodiments of the present invention may be embodied as a method, an apparatus such as a special purpose apparatus, an apparatus such as a data processing system, or a carrier medium, e.g., a computer program product. The carrier medium carries computer readable code for controlling a processing system to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code embodied in the medium.

The software may further be transmitted or received over a network via the network interface device. While the carrier medium is shown in an exemplary embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by the machine and that cause the machine to perform any one or more of the methodologies of the present invention. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media also may also take the form of acoustic or light waves, such as those generated during radio wave and infrared data communications. For example, the term "carrier medium" shall accordingly be taken to included, but not be limited to, solid-state memories, optical and magnetic media, and carrier wave signals.

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

All publications, patents, and patent applications cited herein are hereby incorporated by reference.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

We claim:

1. A computer implemented method of providing a user interface for a search method, the search method aided by a set of topics, the topics not necessarily having a hierarchy, each topic having at least one attachment to at least one information item of a plurality of information items, the method comprising:
   causing a first user interface to be displayed to a first searcher, the user interface providing for the searcher to input search request information including at least one of the group consisting of a search phrase and a subset of one or more search topics of the set of topics;
   carrying out the search method, the search method including:
      accepting the search request information input by the first searcher;
      identifying one or more information items of the plurality of information items according to the accepted search request information; and
      determining one or more suggested topics from the set of topics, the suggested topics being determined according to the attachments of the suggested topics to the one or more identified information items; and
   as a result of carrying out the search method, causing a second user interface to be displayed to the first searcher, the second user interface including at least some of the identified information items and at least one of the suggested topics, the second user interface providing for the first searcher the ability to select one of the suggested topics,
   wherein the suggested topics include one or more refinement topics determined from the set of topics according to a refinement topic criterion using a refinement selection method,
   such that the first searcher selecting one of the suggested topics using the displayed second user interface generates additional results.

2. A method as recited in claim 1, wherein at most a predetermined number of refinement topics are displayed to the viewer.

3. A method as recited in claim 1, wherein the first user interface and the second user interfaces are a first webpage and a second webpage, respectively.

4. A method as recited in claim 1, wherein the additional results include a new set of suggested topics, and causes at least some of topics of the new set of suggested topics to be displayed to the first searcher, such that that a hierarchy of topics is formed on the fly for a particular search for the first searcher.

5. A method as recited in claim 4, further comprising:
   accepting from the searcher new search request information;
   determining new search results including an identified set of information items and a new set of one or more suggested topics, the new search results determined by applying the one or more search criteria with the accepted new search request information; and
   presenting to the searcher the new search results.

6. A method as recited in claim 5,
   wherein the accepted new search request information includes a topic selected from the previously suggested topics;
   wherein the information items in the new search results have attachments to the topic selected from the previously suggested topics.

7. A method as recited in claim 1, wherein the suggested topics presented to the first searcher include one or more similar topics determined from the set of topics according to a topic similarity selection criterion related to the identified information items.

8. A method as recited in claim 7, wherein the similar topics are ordered according to a similarity rank determined according to a similarity topic ranking method.

9. A method as recited in claim 8, wherein at most a predetermined number of similar topics are displayed to the viewer.

10. A computer-readable storage medium for storing computer-readable instructions to instruct a processor of a processing system to execute a computer implemented method of providing a user interface for a search method, the search method aided by a set of topics, the topics not necessarily having a hierarchy, each topic having at least one attachment to at least one information item of a plurality of information items, the method comprising:
   causing a first user interface to be displayed to a first searcher, the user interface providing for the searcher to input search request information including at least one of the group consisting of a search phrase and a subset of one or more search topics of the set of topics;
   carrying out the search method, the search method including:
      accepting the search request information input by the first searcher;
      identifying one or more information items of the plurality of information items according to the accepted search request information; and
      determining one or more suggested topics from the set of topics, the suggested topics being determined according to the attachments of the suggested topics to the one or more identified information items; and
   as a result of carrying out the search method, causing a second user interface to be displayed to the first searcher, the second user interface including at least some of the identified information items and at least one of the suggested topics, the second user interface providing for the first searcher the ability to select one of the suggested topics,
   wherein the suggested topics include one or more refinement topics determined from the set of topics according to a refinement topic criterion using a refinement selection method,
   such that the first searcher selecting one of the suggested topics using the displayed second user interface generates additional results.

11. A storage medium as recited in claim 10, wherein at most a pre-determined number of refinement topics are displayed to the viewer.

12. A storage medium as recited in claim 10 wherein the first user interface and the second user interface are a first webpage and a second webpage, respectively.

13. A storage medium as recited in claim 10, wherein the additional results
include a new set of suggested topics, and causes at least some of topics of the new set of suggested topics to be displayed to the first searcher, such that that a hierarchy of topics is formed on the fly for a particular search for the first searcher.

14. A storage medium as recited in claim 13, wherein the method further comprises:
accepting from the searcher new search request information;
determining new search results including an identified set of information items and a new set of one or more suggested topics, the new search results determined by applying the one or more search criteria with the accepted new search request information; and
presenting to the searcher the new search results.

15. A storage medium as recited in claim 14,
wherein the accepted new search request information includes a topic selected from the previously suggested topics;
wherein the information items in the new search results have attachments to the topic selected from the previously suggested topics.

16. A storage medium as recited in claim 10, wherein the suggested topics
presented to the first searcher include one or more similar topics determined from the set of topics according to a topic similarity criterion related to the identified information items.

17. A storage medium as recited in claim 16, wherein the similar topics are
ordered according to a similarity rank determined according to a similarity topic ranking method.

18. A storage medium as recited in claim 17, wherein at most a pre-determined number of similar topics are displayed to the viewer.

19. A method comprising:
defining a set of topics for attachment to one or more information items of a plurality of information items, the defining being by at least one user, a user being a searcher who has provided registration information, the defining the topics including:
accepting from at least one user at least one topic; and
adding the topic to the set of topics,
wherein the topics do not necessarily have a hierarchical structure;
wherein each topic is for attachment to one or more information items of a plurality of information items, and
wherein the topics that are attached to at least one information item are for searching by a particular searcher for one or more information items of the plurality of information items according to search request information provided by the particular searcher, search request information including at least one topic of the set of topics, the searching including identifying at least one information item that has attachments to the at least one topic of the search request information.

20. A method as recited in claim 19, further comprising:
accepting from at least one user at least one attachment between at least one topic of the set of topics and at least one information item of the plurality of information items; and
for any topic that did not previously have an attachment to an information item, adding the topic to a group of one or more topics that each has at least one attachment to at least one information item of the plurality of information items.

21. A method as recited in claim 19, wherein an initial set of topics is pre-defined.

22. A method as recited in claim 20, wherein the result of a first user defining a first attachment between a first topic and a first information item and a second user defining an attachment between the first topic and the first information item is that at least two attachments exist between the first topic and the first information item.

23. A method as recited in claim 21, further comprising:
accepting from a user a rating for a particular attachment between a particular topic of the set of topics and a particular information item, such that a plurality of attachments between the particular topic and the particular information item can have different ratings.

24. A method as recited in claim 23, wherein the rating has two values, a first value ("positive") and a second value ("negative") less favorable than the first value.

25. A method as recited in claim 23, wherein the rating has more than two values.

26. A method as recited in claim 23, further including determining an overall attachment quality for the attachment or attachments between the particular topic and the particular information item based on the ratings between the particular topic and the particular information item of the attachments by users.

27. A method as recited in claim 19, further comprising:
accepting from at least one user at least one attachment between at least one topic of the plurality of topics and at least one information item of the plurality of information items; and
for any topic that did not previously have an attachment to an information item, adding the topic to a set of topics that each has at least one attachment to at least one information item of the plurality of information items.

* * * * *